(12) United States Patent
Nakamura et al.

(10) Patent No.: US 10,571,924 B2
(45) Date of Patent: Feb. 25, 2020

(54) INFORMATION PROCESSING APPARATUS, MOBILE BODY, AND INFORMATION PROCESSING METHOD

(71) Applicant: Kabushiki Kaisha Toshiba, Minato-ku (JP)

(72) Inventors: Norihiro Nakamura, Kawasaki (JP); Ryo Nakashima, Kawasaki (JP); Manabu Nishiyama, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 148 days.

(21) Appl. No.: 15/440,414

(22) Filed: Feb. 23, 2017

(65) Prior Publication Data

US 2018/0046195 A1 Feb. 15, 2018

(30) Foreign Application Priority Data

Aug. 9, 2016 (JP) .................. 2016-156469

(51) Int. Cl.
| | |
|---|---|
| *G05D 1/02* | (2006.01) |
| *G01C 21/34* | (2006.01) |
| *B60W 10/04* | (2006.01) |
| *B60W 10/20* | (2006.01) |
| *B60W 30/18* | (2012.01) |
| *B60W 50/12* | (2012.01) |

(Continued)

(52) U.S. Cl.
CPC ........... *G05D 1/0219* (2013.01); *B60W 10/04* (2013.01); *B60W 10/20* (2013.01); *B60W 30/18* (2013.01); *B60W 50/12* (2013.01); *B60W 50/14* (2013.01); *G01C 21/34* (2013.01); *G01C 21/3453* (2013.01); *G05D 1/0088* (2013.01); *H04W 4/026* (2013.01); *B60W 2050/143* (2013.01); *B60W 2420/52* (2013.01); *B60W 2420/62* (2013.01); *B60W 2520/06* (2013.01); *B60W 2550/10* (2013.01); *B60W 2550/14* (2013.01); *B60W 2720/24* (2013.01); *G05D 2201/0213* (2013.01)

(58) Field of Classification Search
CPC ...... B60W 10/04; B60W 10/20; B60W 30/18; B60W 50/12; B60W 50/14; G05D 1/0219; G05D 1/0088; G01C 21/34; G01C 21/3453
USPC ........................................... 701/25
See application file for complete search history.

(56) References Cited

U.S. PATENT DOCUMENTS

| | | | | |
|---|---|---|---|---|
| 2015/0241878 A1* | 8/2015 | Crombez | ............. | G05D 1/0088 701/23 |
| 2016/0075333 A1* | 3/2016 | Sujan | ............. | B60W 30/10 701/25 |
| 2017/0371337 A1* | 12/2017 | Ramasamy | .......... | G05D 1/0088 |

FOREIGN PATENT DOCUMENTS

| | | |
|---|---|---|
| JP | 60-000596 A | 1/1985 |
| JP | 2005-100206 A | 4/2005 |

(Continued)

*Primary Examiner* — Thomas G Black
*Assistant Examiner* — Luat T Huynh
(74) *Attorney, Agent, or Firm* — Oblon, McClelland, Maier & Neustadt, L.L.P.

(57) ABSTRACT

According to an embodiment, an information processing apparatus includes a degradation status acquirer and a calculator. The degradation status acquirer is configured to acquire degradation status information of a road surface from an external device or a storage. The calculator is configured to calculate an evaluation value indicative of difficulty with traveling of a mobile body depending on the degradation status information.

18 Claims, 12 Drawing Sheets

(51) Int. Cl.
  *B60W 50/14* (2020.01)
  *G05D 1/00* (2006.01)
  *H04W 4/02* (2018.01)

(56) References Cited

FOREIGN PATENT DOCUMENTS

| | | |
|---|---|---|
| JP | 2007-155504 | 6/2007 |
| JP | 2007-257519 | 10/2007 |
| JP | 2009-216400 | 9/2009 |
| JP | 2013-20288 | 1/2013 |
| JP | 2016-057861 A | 4/2016 |

\* cited by examiner (A)　　　　　　　　　　　　(B)

INFORMATION PROCESSING APPARATUS, MOBILE BODY, AND INFORMATION PROCESSING METHOD

CROSS-REFERENCE TO RELATED APPLICATIONS

This application is based upon and claims the benefit of priority from Japanese Patent Application No. 2016-156469, filed on Aug. 9, 2016; the entire contents of which are incorporated herein by reference.

FIELD

Embodiments described herein relate generally to information processing apparatus, a mobile body, and an information processing method.

BACKGROUND

Attention has been focused on the automatic operation technology for automatic steering of vehicles. For example, disclosed is a technique for providing assistance to traveling based on information of an environment around vehicles.

For example, disclosed in JP-A 2007-257519 (KOKAI) is the technique for predicting an avoidance line for preventing a collision on the basis of a result of prediction of the travel line of another vehicle.

Here, the degradation status of a road surface influences a travel environment. For example, a tire of a vehicle caught in a rut would cause the vehicle to travel with difficulty. However, the degradation status of a road surface has never been taken into account. Thus, travel assistance that depends on the road surface status has not been provided.

DETAILED DESCRIPTION

According to an embodiment, an information processing apparatus includes a degradation status acquirer and a calculator. The degradation status acquirer is configured to acquire degradation status information of a road surface from an external device or a storage. The calculator is configured to calculate an evaluation value indicative of difficulty with traveling of a mobile body depending on the degradation status information.

Now, referring to the attached drawings, a description will be made in detail to an information processing apparatus, an information processing method, and a mobile body.

First Embodiment

Figure 1:
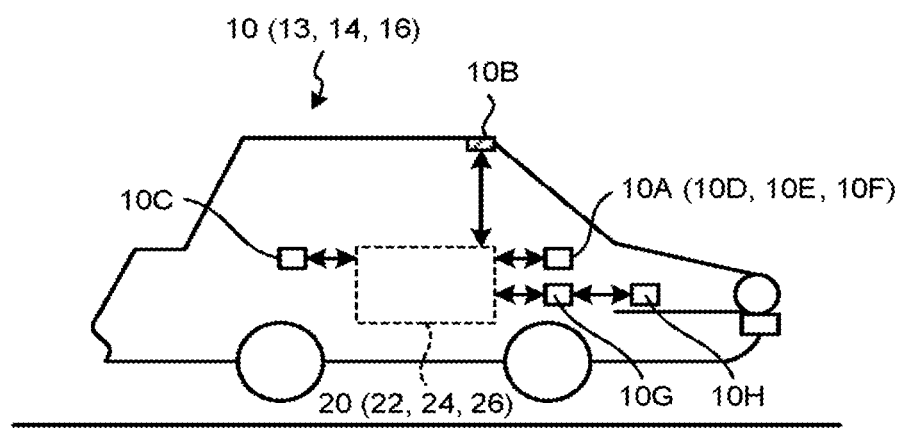
FIG. 1 is a view illustrating a mobile body.

FIG. 1 is a view illustrating an example of a mobile body 10 of this embodiment.

The mobile body 10 is provided with an information processing apparatus 20, an output circuit 10A, a sensor 10B, an input device 10C, a driver control circuit 10G, and a driver 10H.

For example, the information processing apparatus 20 calculates an evaluation value indicative of the difficulty of travel of the mobile body 10 depending on the degradation status of a road surface (to be discussed later in more detail). The information processing apparatus 20 may be, for example, a special-purpose or general-purpose computer. In this embodiment, by way of example, a description will be made to a case where the information processing apparatus 20 is mounted in the mobile body 10.

The mobile body 10 is movable by traveling. The mobile body 10 may be, for example, a vehicle (a two-wheeled automobile, four-wheeled automobile, or bicycle), a carrier, or a robot. For example, the mobile body 10 travels with human intervention in driving or can automatically travel (autonomously travels) without human intervention in driving. In this embodiment, by way of example, a description will be made to a case where the motile body 10 is capable of autonomously traveling.

Note that the information processing apparatus 20 is not limited to the mode with the apparatus mounted in the mobile body 10. The information processing apparatus 20 may also be mounted on a stationary object. The stationary object is one that is secured to the ground. The stationary object is an immobile object or one that is at a standstill relative to the ground. The stationary object is, for example, a guard rail, a pole, a parked vehicle, or a road sign. On the other hand, the information processing apparatus 20 may also be mounted on a cloud server that executes processing in the cloud.

The driver 10H is a drive device (or powering means) mounted in the mobile body 10. For example, the driver 10H is an engine, a motor, a drive wheel, a steering wheel position changer, and a seat driver.

The steering wheel is used for steering the mobile body 10. The steering wheel position change unit drives the steering wheel, for example, so as to change the position of the steering wheel in the mobile body 10 between a first position which facilitates steering by the driver (operator) and a second position that is shifted from the first position. As compared with the case where the steering wheel is located at the first position, the second position is set such that it does not allow part of the driver's field of view to be readily blocked by the steering wheel. The driver's field of view is set as the field of view when the driver sitting at the driver's seat visually identifies the travel direction of the mobile body 10. In other words, the second position is set such that it causes the blocking rate of the driver's field of view by the steering wheel in the mobile body 10 to he equal to or less than a threshold value. More specifically, the second position is located toward the ground (toward the driver's feet) relative to the first position. On the other hand, the first position is set such that it causes the blocking rate of the driver's field of view by the steering wheel in the mobile body 10 to be greater than the threshold value.

The seat driver vibrates the seat in which the driver is sitting. Note that the seat driver may also be configured to vibrate at least one of those seats, mounted in the mobile body 10, which include the seat the driver sits in and other seats than that seat.

The driver control circuit 10G controls the driver 10H. By the control of the driver control circuit 10G, the driver 10H is driven.

The output circuit 10A outputs various types of information. In this embodiment, the output circuit 10A provides output information including the aforementioned evaluation value.

The output circuit 10A is provided with, for example, the communication function for transmitting the output information, the display function for displaying the output information, and the sound output function for outputting sound indicative of the output information. For example, the output circuit 10A includes a communication circuit 10D, a display 10E, and a loudspeaker 10F.

The communication circuit 10D transmits the output information to another device. For example, the communication circuit 10D transmits the output information via a well-known communication line. The display 10E displays the output information. The display 10E is, for example, a well-known liquid crystal display (LCD), a projection device, or a lighting device. The loudspeaker 10F outputs sound indicative of the output information.

The input device 10C receives various type of instructions or information entered by the user. The input device 10C may be, for example, a pointing device such as a mouse or a track ball, or an input device such as a keyboard. On the other hand, the input device 10C may also be an input function of a touch panel integrated with the display 10E.

The sensor 10B acquires the travel environment of the mobile body 10. The travel environment is, for example, the observation information of the mobile body 10 or the surrounding information of the mobile body 10. The sensor 10B is, for example, an external sensor or an internal sensor.

The internal sensor is a sensor for observing the observation information. The observation information includes at least the acceleration of the mobile body 10. More specifically, the observation information includes at least one of the acceleration of the mobile body 10, the speed of the mobile body 10, and the angular velocity of the mobile body 10.

The internal sensor is, for example, an inertial measurement unit (IMU), an acceleration sensor, a speed sensor, or a rotary encoder. The IMU observes the observation information including the triaxial acceleration and the triaxial angular velocity of the mobile body 10.

The external sensor observes the surrounding information of the mobile body 10. The external sensor may be mounted in the mobile body 10 or may also be mounted outside the mobile body 10 (for example, in another mobile body or an external device).

The surrounding information is indicative of the status of e surrounding of the mobile body 10. The surrounding of the mobile body 10 is defined as an area within a predetermined range from the mobile body 10. This range can be observed by the external sensor. This range may be set in advance.

The surrounding information is, for example, at least one of a captured image of the surrounding of the mobile body 10 and distance information. Note that the surrounding information may also include the position information of the mobile body 10. The captured image is captured image data that is provided by capturing an image (hereinafter simply referred to as the captured image). The distance information is indicative of the distance from the mobile body 10 to a target. The target is an external place that can be observed by the external sensor. The position information may be a relative position or may also be an absolute position.

The external sensor is, for example, an image capturing device for acquiring a captured image by capturing an image, a distance sensor (an extremely high frequency radar, laser sensor, or distance image sensor), a position sensor (the global navigation satellite system (GNSS) or the global positioning system (GPS)), and a wireless communication device.

For example, the captured image data is digital image data that specifies a pixel value for each pixel or a depth map that specifies the distance from the sensor 10B for each pixel. The laser sensor is, for example, a two-dimensional laser imaging detection and ranging (LIDAR) sensor set up in parallel to a horizontal plane, or a three-dimensional LIDAR sensor.

Figure 2:
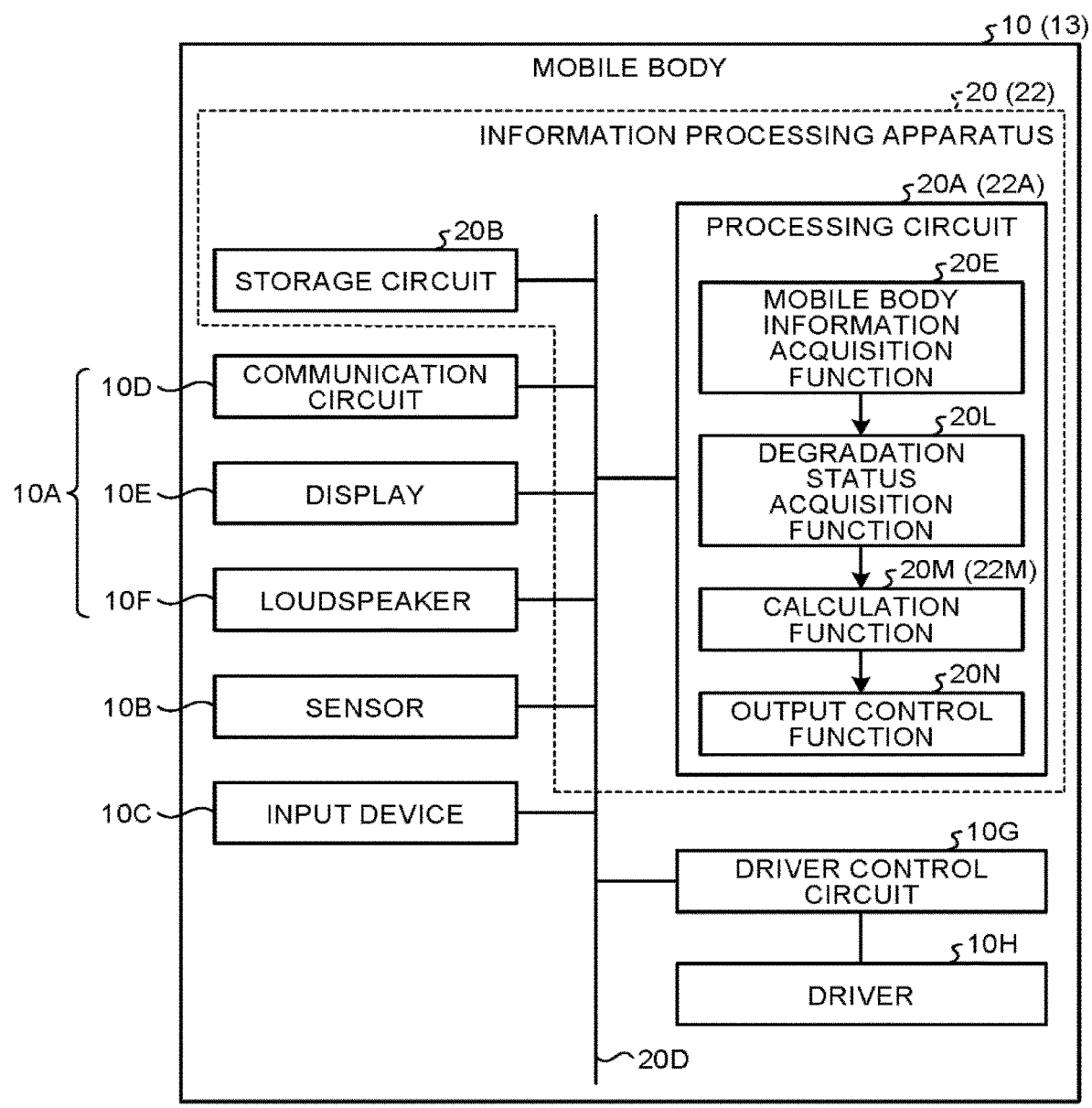
FIG. 2 is a block diagram illustrating a mobile body.

Now, a description will be made to an electrical configuration of the mobile body 10. FIG. 2 is a block diagram illustrating an example of a configuration of the mobile body 10.

The mobile body 10 is provided with the information processing apparatus 20, the output circuit 10A, the sensor 10B, the input device 10C, the driver control circuit 10G, and the driver 10H. As described above, the output circuit 10A includes the communication circuit 10D, the display 10E, and the loudspeaker 10F.

The information processing apparatus 20, the output circuit 10A, the sensor 10B, the input device 10C, and the driver control circuit 10G are connected to one another via a bus 20D. The driver 10H is connected to the driver control circuit 10G. The information processing apparatus 20 has a storage circuit 20B and a processing circuit 20A. That is, the output circuit 10A, the sensor 10B, the input device 10C, the driver control circuit 10G, the processing circuit 20A, and the storage circuit 20B are connected via the bus 20D.

Note that at least one of the storage circuit 20B, the output circuit 10A (the communication circuit 10D, the display 10E, and the loudspeaker 10F), the sensor 10B, the input device 10C, and the driver control circuit 10G may be wired or wirelessly connected to the processing circuit 20A. Furthermore, at least one of the storage circuit 20B, the output circuit 10A (the communication circuit 10D, the display 10E, and the loudspeaker 10F), the sensor 10B, the input device 10C, and the driver control circuit 10G may be connected to the processing circuit 20A via a network.

The storage circuit 20B stores various types of data. The storage circuit 20B is, for example, a semiconductor memory device such as a random access memory (RAM) device or a flash memory device, a hard disk, or an optical disc. Note that the storage circuit 20B may also be a storage device that is provided outside the information processing apparatus 20. Furthermore, the storage circuit 20B may also be a storage medium. More specifically, the storage medium may store or temporarily store a program or various types of information downloaded, for example, through a local area network (LAN) or the Internet. Furthermore, the storage circuit 20B may also be configured from a plurality of storage media.

The processing circuit 20A is provided with a mobile body information acquisition function 20E, a degradation status acquisition function 20L, a calculation function 20M, and an output control function 20N.

Each processing function in the processing circuit 20A is stored in the storage circuit 20B in the form of a computer executable program. The processing circuit 20A is a processor for reading the programs from the storage circuit 20B and executing the programs, thereby implementing the function corresponding to each of the programs.

When having read each program, the processing circuit 20A has each of the functions indicated in the processing circuit 20A of FIG. 2. In FIG. 2, a description will be made on the presumption that a single processing circuit 20A implements the mobile body information acquisition function 20E, the degradation status acquisition function 20L, the calculation function 20M, and the output control function 20N.

Note that the processing circuit 20A may also be configured from a combination of a plurality of independent processors for implementing each of the functions. In this case, each processor executes the program to thereby implement each function. On the other hand, each processing function may also be configured as a program so that one processing circuit may execute each program, or a particular function may also be implemented in a dedicated independent program execution circuit.

Note that the term "processor" used in this embodiment and an embodiment to be discussed later refers, for example, to circuits such as a central processing unit (CPU), a graphical processing unit (GPU), an application specific integrated circuit (ASIC), a programmable logic device (for example, a simple programmable logic device (SPLD), a complex programmable logic device (CPLD), and a field programmable gate array (FPGA)).

The processor reads and executes a program stored in the storage circuit 20B, thereby implementing the function. Note that in place of storing a program in the storage circuit 20B, the program may also be directly incorporated into the circuit of the processor. In this case, the processor reads and executes the program having been incorporated into the circuit, thereby implementing the function.

The mobile body information acquisition function 20E is an example of the mobile body information acquirer. The mobile body information acquisition function 20E acquires the mobile body information of the mobile body 10. In this embodiment, the mobile body information is indicative of the current position and the travel direction of the mobile body 10.

For example, the mobile body information acquisition function 20E acquires the mobile body information, including the current position and the travel direction of the mobile body 10, from the travel environment observed by the sensor 10B (the observation information or the surrounding information).

For example, the mobile body information acquisition function 20E acquires latitude-longitude information and attitude information from the sensor 10B of a combination of the GPS and IMU. Then, the mobile body information acquisition function 20E employs a well-known method to derive the current position and the travel direction of the mobile body 10 from the latitude-longitude information and the attitude information.

Note that the mobile body information acquisition function 20E may also employ another method to acquire the mobile body information. For example, the mobile body information acquisition function 20E may also employ only the latitude-longitude information observed by the GPS to derive the current position and the travel direction. In this case, the mobile body information acquisition function 20E may only have to employ, as the current position, the latitude-longitude information observed by the GPS. Furthermore, the mobile body information acquisition function 20E may also derive the travel direction of the mobile body 10 from the difference between the latitude-longitude information just observed by the GPS and the latest observed latitude-longitude information.

Furthermore, using the result of observation by the GPS and IMU and the input information entered by the user manipulating the input device 10C, the mobile body information acquisition function 20E determines the latitude-longitude information of a travel start point and the attitude information. Then, the mobile body information acquisition function 20E may also estimate the self-position by using the latitude-longitude information of the travel start point and the attitude information, and the image recognition result of a captured image acquired during traveling by the image capturing device included in the sensor 10B. The mobile body information acquisition function 20E may also employ the self-position estimate to derive the current position and the travel direction of the mobile body 10.

Note that for the self-position estimate, a well-known method may be employed. For example, in the fields of three-dimensional reconfiguration and image recognition, various methods for the self-position estimate have been suggested.

Note that the derivation of the current position and the travel direction of the mobile body 10 by the mobile body information acquisition function 20E is not limited to the aforementioned methods. For example, the mobile body information acquisition function 20E may also derive the current position and the travel direction of the mobile body 10 by combining a plurality of methods mentioned above together.

More specifically, while the mobile body 10 is traveling in an environment in which the accuracy of observation by an external sensor such as the GPS is degrading, the mobile body information acquisition function 20E may derive the current position and the travel direction of the mobile body 10 using the observation result provided by the external sensor. The environment in which the accuracy of observation by the external sensor is degrading may be, for example, a travel environment in which the mobile body 10 is traveling through a tunnel. On the other hand, while the mobile body 10 is traveling in an environment in which the accuracy of observation by the external sensor is high, the mobile body information acquisition function 20E may employ the observation result provided by the internal sensor and the external sensor (for example, the IMU and GPS) so as to derive the current position and the travel direction of the mobile body 10.

Then, the mobile body information acquisition function 20E derives the current position and the travel direction of the mobile body 10, thereby acquiring the mobile body information indicative of the current position and the travel direction.

The degradation status acquisition function 20L acquires the degradation status information of a road surface. The degradation status information is indicative of the degradation status of a road surface. The degradation status information is indicative of at least one of the type of road surface degradation, the rate of presence of road surface degradation, and the level of road surface degradation.

The type of road surface degradation is, for example, a crack, a crocodile crack, a pothole, or a rut. The crocodile crack may also be referred to as, for example, the turtleback-shaped crack, the map-shaped crack, or the spider-web-shaped crack. Note that the difference between the crack and the crocodile crack is that the crack runs only in one direction, whereas the crocodile crack runs in multiple mutually intersecting directions. The pothole is indicative of a hole or recess formed on the road surface. The rut is indicative of bumps and dips elongated in the travel direction on the road. Note that the types of road surface degradation are not limited to those mentioned above.

The rate of presence of road surface degradation is indicative of the probability of presence of road surface degradation. In this embodiment, the rate of presence of road surface degradation is expressed by values within the range of 0.0 to 1.0. The rate of presence of road surface degradation of 0.0 means that there exists no road surface degradation. The rate of presence of road surface degradation of 1.0 indicates that there exists road surface degradation at a predetermined threshold value or greater, and the rate of presence is at the maximum value.

The level of road surface degradation is an indicator indicative of the level of progress of road surface degradation. The level of road surface degradation is expressed, for example, by the maximum value within a range (0.1 to 1.0) from 0.1 with the least progressed degradation to 1.0 with the most progressed degradation.

Note that the rate of presence of road surface degradation and the level of road surface degradation are not limited to the mode of being expressed by a value within the range of 0.1 to 1.0. For the sake of simplicity, a description will be made below to the cases where the rate of presence of road surface degradation and the level of road surface degradation are expressed by a value within the range of 0.1 to 1.0.

In this embodiment, the degradation status information includes each division degradation status information of a plurality of divided regions included on a road surface. The division degradation status information is indicative of the degradation status of a divided region. That is, the division degradation information is indicative of the degradation status information within a divided region. The degradation status information is defined in the same manner as above.

Figure 3:
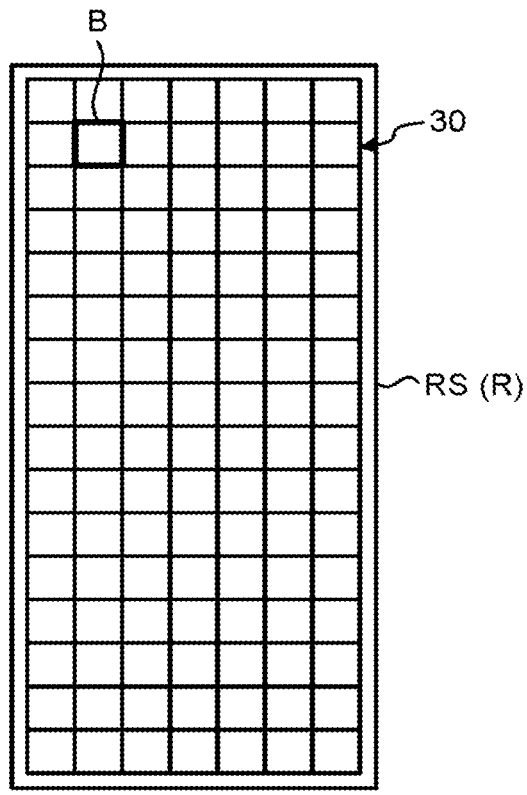
FIG. 3 is a schematic diagram illustrating degradation status information.

FIG. 3 is a schematic diagram illustrating an example of degradation status information 30. The degradation status information 30 consists of a group of pieces of degradation status information of each of divided regions B of a certain size into which a road surface RS has been divided. That is, in this embodiment, the degradation status information 30 is indicative of the degradation status information of each divided region B (at least one of the type of road surface degradation, the rate of presence of road surface degradation, and the level of road surface degradation). Note that hereinafter, a description may be made with the degradation status information of the divided regions B being referred to as the division degradation status information.

The degradation status acquisition function 20L may acquire the degradation status information 30 from an external device connected, for example, via the Internet, or from the storage circuit 20B. In this embodiment, the degradation status acquisition function 20L acquires the degradation status information 30 of a current travel route R of the mobile body 10.

More specifically, the degradation status acquisition function 20L identifies the current travel route R of the mobile body 10 on the basis of the mobile body information (the current position and the travel direction) acquired by the mobile body information acquisition function 20E.

The degradation status acquisition function 20L may employ a well-known method to identify the current travel route R of the mobile body 10. For example, the degradation status acquisition function 20L compares the mobile body information (the current position and the travel direction) acquired by the mobile body information acquisition function 20E with the position information of each of a plurality of routes R included in the map information of the area which includes the current position of the mobile body 10. That is, the degradation status acquisition function 20L makes comparison on the plurality of routes R to find on which route R the current position of the mobile body 10 is located. By the comparisons, the information processing apparatus 20 identifies the current travel route R of the mobile body 10.

Then, the degradation status acquisition function acquires the degradation status information 30 corresponding to the identified route R (the current travel route R) from an external device or the storage circuit 20B. Thus, the identification information of the route R and the degradation status information 30 of the route R identified by the identification information is associated with each other and then stored in the external device or the storage circuit 20B in advance. Then, the degradation status acquisition function 20L may acquire, from the external device or the storage circuit 20B, the degradation status information 30 corresponding to the identified current travel route R.

Referring back to FIG. 2, a description will be continued. The calculation function 20M is an example of a calculator. The calculation function 20M calculates an evaluation value depending on the degradation status information acquired by the degradation status acquisition function 20L.

The evaluation value is indicative of the difficulty with the traveling of the mobile body 10. That is, if the degradation status information of a road surface indicates a greater difficulty with the traveling of the mobile body 10, the calculation function 20M calculates a higher evaluation value (i.e., greater difficulty with the traveling). In other words, if the degradation status information of a road surface indicates a greater ease with the traveling of the mobile body 10, the calculation function 20M calculates a lower evaluation value (i.e., greater ease with the traveling).

Note that the calculation function 20M may also calculate an evaluation value for the entire route R on the basis of the degradation status information of the road surface RS of the current travel route R of the mobile body 10. Furthermore, on the basis of the degradation status information of the road surface RS of the current travel route R of the mobile body 10, the calculation function 20M may also calculate the evaluation value of a region, on the road surface RS, located along the current travel direction from the current position of the mobile body 10.

In this embodiment, for the degradation status information 30 of the current travel route R acquired by the degradation status acquisition function 20L, the calculation function 20M calculates the evaluation value (referred to as the division evaluation value) of each of the divided regions B using the division degradation status information of the divided regions B included in the degradation status information 30. Then, the calculation function 20M calculates the evaluation value of the current travel route R using the division evaluation value.

For example, the calculation function 20M calculates the evaluation value of the route R using a function that allows the evaluation value to monotonously increase with increases in the value indicative of the degradation status information.

More specifically, the calculation function 20M employs the function expressed in Equation (1) below to calculate the evaluation value of each of the divided regions B.

$$Eb = f_1(\alpha) + f_2(\beta) + f_3(\gamma) + f_4(\sigma) \tag{1}$$

In Equation (1), Eb denotes the evaluation value of the divided region B (hereinafter, may also be referred to as the division evaluation value), α denotes the probability of presence of a rut, β denotes the probability of presence of pothole, γ denotes the probability of presence of a crack, and σ denotes the level of rack.

In Equation (1), $f_1(\alpha)$ is the function for providing an evaluation value that monotonously increases with α (the probability of presence of a rut); $f_2(\beta)$ is the function for providing an evaluation value that monotonously increases with β (the probability of presence of a pothole); $f_3(\gamma)$ is the function for providing an evaluation value that monotonously increases with γ (the probability of presence of a crack); $f_4(\sigma)$ is the function for providing an evaluation value that monotonously increases with σ (the level of a crack).

In this embodiment, the calculation function 20M calculates, as a division evaluation value Eb, the total value of the output values (evaluation values) obtained by each of $f_1(\alpha)$, $f_2(\beta)$, $f_3(\gamma)$, and $f_4(\sigma)$. Then, the calculation function 20M calculates the division evaluation value Eb for each of the divided regions B included in the current travel route R. Furthermore, the calculation function 20M calculates, as the evaluation value of the route R, the average value of the division evaluation values Eb of the respective divided regions B included in the current travel route R.

Note that each of the functions ($f_1(\alpha)$, $f_2(\beta)$, $f_3(\gamma)$, and $f_4(\sigma)$ in the above) used for calculating the evaluation value provides an output value that monotonously increases with increases of the parameter (α, β, γ, and σ). Each of these functions ($f_1(\alpha)$, $f_2(\beta)$, $f_3(\gamma)$, and $f_4(\sigma)$) in the above) may be determined in advance on the basis of the magnitude of influence on the steering of the mobile body 10.

For example, it is highly possible that a tire of the mobile body 10 is caught by a rut or a pothole present on the road surface RS during traveling. Thus, for the information processing apparatus 20, a function indicative of a logarithmic change may be designed in advance as the function of each of $f_1(\alpha)$ and $f_2(\beta)$. More specifically, the function indicative of a logarithmic change exhibits such changes as to provide an output value of "0" (zero) when α (the probability of presence of a rut) or β (the probability of presence of a pothole) is equal to "0" (zero), and abruptly approach "1.0" as α (the probability of presence of a rut) or β (the probability of presence of a pothole) increases.

Furthermore, there is a possibility that the crack and the crocodile crack may influence the steering of the mobile body 10 as the progress of degradation increases. Thus, for the information processing apparatus 20, a function indicative of an exponential change may be designed in advance as the function of each of $f_3(\gamma)$ and $f_4(\sigma)$. More specifically, the function indicative of an exponential change exhibits such changes as to provide an output value of "0" (zero) when γ (the probability of presence of a crack) or σ (the level of a crack) is equal to "0" (zero), and an abruptly increased output value (evaluation value) with γ (the probability of presence of a crack) or σ (the level of a crack) near "1.0".

Note that the function ($f_1(\alpha)$, $f_2(\beta)$, $f_3(\gamma)$, and $f_4(\sigma)$ in the above) to be used for calculation of the evaluation value may be any function so long as the function provides an output value that monotonously increases with increases in the parameter (α, β, γ, σ), and is thus not limited to the aforementioned ones.

For example, the function ($f_1(\alpha)$, $f_2(\beta)$, $f_3(\gamma)$, and $f_4(\sigma)$ in the above) to be used for calculation of the evaluation value may also be a function for providing an output value that linearly increases with increases in the parameter (α, β, γ, σ).

Note that Equation (1) above is adapted to calculate the evaluation value using each function of the four parameters of α (the probability of presence of a rut), β (the probability of presence of a pothole), γ (the probability of presence of a crack), and σ (the level of a crack). However, the calculation function 20M employs the function of at least one parameter may only have to calculate the evaluation value (here, the division evaluation value), and is thus not limited to a mode that employs the aforementioned four types of and four parameters. In other words, the calculation function 20M may only have to employ information included in the degradation status information 30 to calculate the evaluation value, whereas the information not included in the degradation status information 30 may not be employed to calculate the evaluation value. Furthermore, the calculation function 20M may only have to employ at least one of all pieces of information included in the degradation status information 30 to calculate the evaluation value, and does not need to use all pieces of information included in the degradation status information 30.

For example, the calculation function 20M may also employ the two functions, the function $f_1(\alpha)$ of α (the probability of presence of a rut) and the function $f_2(\beta)$ of β (the probability of presence of a pothole) so as to calculate the division evaluation value Eb.

Then, the calculation function 20M calculates the division evaluation value Eb for each of the divided regions B included in the current travel route R. Furthermore, the calculation function 20M calculates, as the evaluation value of the route R, the average value of the division evaluation values Eb of the respective divided regions B included in the current travel route R.

Note that the calculation function 20M is not limited to such a mode as to calculate, as the evaluation value of the route R, the average value of the division evaluation values Eb of the respective divided regions B included in the current travel route R. The calculation function 20M may also calculate the evaluation value of the route R from the division evaluation value Eb of each of the divided regions B by employing various well-known techniques used for evaluation of a series of statistical data.

For example, the calculation function 20M may also calculate, as the evaluation value of the route R, the maximum value (the maximum division evaluation value Eb) of the division evaluation values Eb of the respective divided regions B. Furthermore, the calculation function 20M may also calculate, as the evaluation value of the route R, the median of the division evaluation values Eb of the respective divided regions B.

The output control function 20N is an example of an output controller. The output control function 20N outputs the evaluation value calculated by the calculation function 20M.

More specifically, the output control function 20N outputs the evaluation value to at least one of the driver control circuit 10G and the output circuit 10A.

Figure 4:
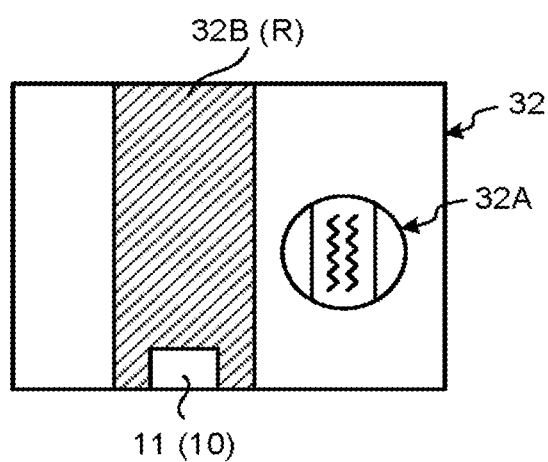
FIG. 4 is a schematic diagram illustrating an example of a display image.

For example, the output control function 20N displays, on the display 10E, the output information including the evaluation value. FIG. 4 is a schematic diagram illustrating an example of a display image 32. For example, the output control function 20N displays, on the display 10E, the display image 32 including an icon image 32A depending on the evaluation value.

For example, the display image 32 includes an image 32B indicative of the current travel route R of the mobile body 10, a vehicle image 11 indicative of the mobile body 10, and the icon image 32A. The icon image 32A is indicative of the evaluation value. In the example illustrated in FIG. 4, the icon image 32A indicates a road surface RS that has a high evaluation value (i.e., a status of higher degradation), and imitates a crack.

Referring back to FIG. 2, the output control function 20N may also control the display 10E or the loudspeaker 10F so a to output sound or light that is indicative of the evaluation value calculated by the calculation function 20M. Furthermore, the output control function 20N may also output the evaluation value calculated by the calculation function 20M to the driver control circuit 10G.

In this case, the driver control circuit 10G controls, for example, the driver 10H (for example, the steering wheel position change unit and the seat driver) depending on the value of the evaluation value calculated by the calculation function 20M. More specifically, the driver control circuit 10G controls the driver 10H in a manner such that the greater the evaluation value, the more strongly the driver's seat of the mobile body 10 vibrates. Note that the driver control circuit 10G may also control the driver 10H in a manner such that the driver's seat of the mobile body 10 vibrates when the evaluation value calculated by the calculation function 20M is equal to or greater than a predetermined threshold value.

Furthermore, the driver control circuit 10G controls the driver 10H so as to change the position of the steering wheel of the mobile body 10 from the second position to the first position when the evaluation value calculated by the calculation function 20M is equal to or greater than a predetermined threshold value.

For example, the driver control circuit 10G, which provides such control as mentioned above, can prompt the driver to release the automatic operation and then steer the steering wheel by herself or himself when the road surface RS of the current travel route R of the mobile body 10 is difficult to travel on.

Furthermore, depending on the evaluation value calculated by the calculation function 20M, the driver control circuit 10G may also produce a driver control signal for controlling the driver 10H and then control the driver 10H. The driver control signal is to control a drive unit in the driver 10H for the mobile body 10 to be driven to travel. For example, the driver control circuit 10G controls the steering or the engine of the mobile body 10 so that the higher the evaluation value (i.e., the more difficult the traveling is due to a significantly degraded road surface RS) the more stable the traveling can be maintained to be.

Figure 5:
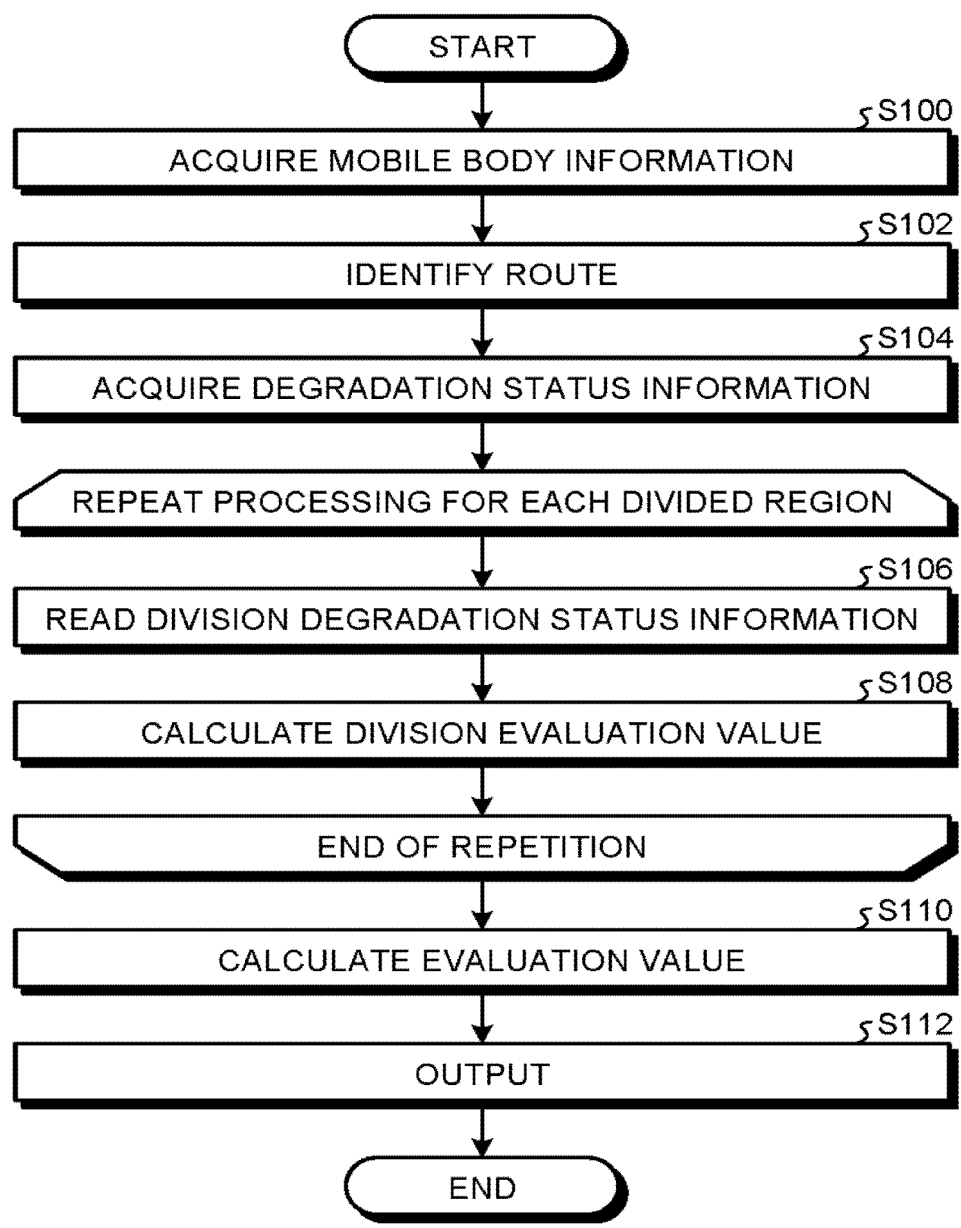
FIG. 5 is a flow chart of an example of a procedure for processing information.

Now, a description will be made to the procedure of the information processing to be executed by the processing circuit 20A. FIG. 5 is a flow chart of an example of the procedure of the information processing to be executed by the processing circuit 20A.

First, the mobile body information acquisition function 20E acquires mobile body information (step S100). Then, the degradation status acquisition function 20L identifies the current travel route R of the mobile body 10 on the basis of the mobile body information (the current position and the travel direction) acquired in step S100 (step S102).

Then, the degradation status acquisition function 20L acquires the degradation status information 30 corresponding to the route R identified in step S102 (step S104).

Then, the calculation function 20M repeatedly executes the processing from step S106 to step S108 for each of the divided regions B included in the degradation status information 30 acquired in step S104. More specifically, the calculation function 20M reads, from the degradation status information 30, the division degradation status information of the divided region B to be processed (step S106). Then, the calculation function 20M employs the division degradation status information having been read in step S106 to calculate the division evaluation value Eb of the divided region B being processed (step S108).

Then, the process proceeds to step S110 when the calculation function 20M ends the processing of step S106 to step S108 for each of all the divided regions B included in the degradation status information 30 of the route R identified in step S102.

In step S110, the calculation function 20M calculates the evaluation value of the route R identified in step S102 using the division evaluation values Eb of the respective divided regions B calculated in the processing of step S106 to step S108 (step S110).

Then, the output control function 20N outputs the evaluation value calculated by the calculation function 20M (step S112), and then the process exits the routine.

As described above, the information processing apparatus 20 of this embodiment is provided with the degradation status acquisition function 20L and the calculation function 20M. The degradation status acquisition function 20L acquires the degradation status information 30 of the road surface RS. The calculation function 20M calculates, depending on the degradation status information 30, an evaluation value indicative of the difficulty with the traveling of the mobile body 10.

As described above, depending on the degradation status information 30 of the road surface RS, the information processing apparatus 20 calculates the evaluation value indicative of the difficulty with the traveling of the mobile body 10. Thus, the information processing apparatus 20 outputs the evaluation value to the output circuit 10A or the driver control circuit 10G, thereby providing traveling assistance to the driver of the mobile body 10 depending on the degradation status of the road surface RS.

Thus, the information processing apparatus 20 of this embodiment is capable of providing traveling assistance depending on the status of a road surface.

Furthermore, the output control function 20N outputs the evaluation value to at least one of the driver control circuit 10G and the output circuit 10A. Thus, the information processing apparatus 20 is capable of readily presenting, to the driver, the information indicative of whether the current travel road surface RS is suitable for automatic operation. Furthermore, the information processing apparatus 20 is capable of readily presenting, to the driver, the situation in which the operation mode will be switched, with high possibility from the state of automatic operation to an automatic operation release state that requires driver's manipulation.

Modified Example

In the embodiment above, the calculation function 20M calculates the evaluation value depending on the degradation status information 30. In this modified example, the evaluation value is calculated depending on the specification information of the mobile body 10 and the degradation status information 30.

FIG. 2 is a black diagram illustrating an exemplary configuration of a mobile body 13 of this modified example. The mobile body 13 is provided with an information processing apparatus 22, the output circuit 10A, the sensor 10E, the input device 10C, the driver control circuit 10G, and the driver 10H. The mobile body 13 is configured in the same manner as the mobile body 10 of the first embodiment except that the information processing apparatus 20 is replaced by the information processing apparatus 22 (also see FIG. 1).

The information processing apparatus 22 has the storage circuit 20B and a processing circuit 22A. The information processing apparatus 22 is configured in the same manner as the information processing apparatus 20 of the first embodiment except that the processing circuit 20A is replaced by the processing circuit 22A.

The processing circuit 22A is provided with the mobile body information acquisition function 20E, the degradation status acquisition function 20L, a calculation function 22M, and the output control function 20N. The processing circuit 22A is configured in the same manner as the processing circuit 20A of the first embodiment except that the calculation function 20M is replaced by the calculation function 22M.

Like the calculation function 20M of the first embodiment, concerning the degradation status information 30 of the current travel route R, the calculation function 22M calculates the evaluation value of each of the divided regions B (referred to as the division evaluation value) using the division degradation status information of the divided regions B included in the degradation status information 30.

At this time, in this modified example, the calculation function 22M calculates an evaluation value depending on the specification information and the degradation status information 30. That is, the calculation function 22M calculates the division evaluation value of each of the divided regions B using the division degradation status information of the divided regions B included in the degradation status information 30, and the specification information.

Then, the calculation function 22M employs the division evaluation value to calculate the evaluation value of the current travel route R.

The specification information is indicative of the specification that affects the surface of contact the mobile body 13 with the road surface RS.

For example, the specification information is indicative of specifications such as the type information indicative of the type of the mobile body 13, the weight of the mobile body 13, the stroke length of the suspension of the mobile body 13, the drive method, and the width of the tires. More specifically, the type information is indicative of the two-wheeled vehicle or the four-wheeled vehicle. Note that the specifications of the mobile body 13 included in the specification information are not limited to those mentioned above.

The calculation function 22M may acquire the specification information by reading the specification information from the storage circuit 20B. The storage circuit 20B may store the specification information in advance.

Then, the calculation function 22M employs the specification information and the division degradation status information to calculate the division evaluation value of each of the divided regions B. At this time, the calculation function 22M calculates a higher division evaluation value if the specification information is more influential on the deterioration of a travel environment.

First, for each specification included in the specification information, the calculation function 22M quantizes the value specified by the specification into any one of classes 1 to N (N is an integer equal to two or greater).

More specifically, according to the specification, the calculation function 22M quantizes the value specified by the specification into any one of classes 1 to N in a manner such that the value specified by the specification is quantized into a class of a greater value when the value specified by the specification less likely absorbs the influence exerted by the degradation status of the road surface RS on the traveling.

On the other hand, according to the specification, the calculation function 22M quantizes the value specified by the specification into any one of classes 1 to N in a manner such that the value specified by the specification is quantized into a class of a smaller value when the value specified by the specification more likely absorbs the influence exerted by the degradation status of the road surface RS on the traveling.

For example, for the specification "Suspension", the longer the stroke, the more likely the irregularities of the road surface RS are absorbed. Thus, for the specification "Suspension", the calculation function 22M quantizes the value indicative of "Suspension" in a manner such that a longer stroke is indicative of a class of a smaller value (quantized value).

Furthermore, when the value of the specification "Type of the mobile body 13" is "the four-wheeled automobile", the influence of irregularities of the road surface RS is less likely exerted as compared with "the two-wheeled automobile". Thus, for the specification "Type of the mobile body 13", the calculation function 22M quantizes the value indicative of "Type of the mobile body 13" in a manner such that the class of "the tour-wheeled automobile" (a quantized value) is indicative of a class of a value that is less than the class of "the two-wheeled automobile" (a quantized value).

More specifically, for each specification included in the specification information, the calculation function 22M classifies in advance the range, which the values of the specifications can take, into N classes depending on the ease of absorption of the influence exerted by the degradation status of the road surface RS on the traveling. Then, the calculation function 22M identifies a class corresponding to the value specified by the specification included in the specification information, thereby quantizing the value specified by the specification.

For example, the calculation function 22M determines to which class the value specified by the specification "Suspension" (i.e., the stroke length) included in the specification information belongs, the class being one of N classes into which the range the value of the specification can take is classified. Then, the determined class is employed as a quantized value of the information of the specification.

Then, for each specification, the calculation function 22M calculates the evaluation value of each of the divided regions R.

Equation (2) below is a function, corresponding to the specification "Suspension", to be used for calculation of the division evaluation value Ebs of the divided regions B.

$$Ebs = f_5(i, \alpha) + f_6(i, \beta) + f_7(i, \gamma) + f_8(i, \sigma) \qquad (2)$$

In Equation (2), Ebs is indicative of the evaluation value of the divided region B (the division evaluation value) corresponding to the specification "Suspension"; $\alpha$, $\beta$, $\gamma$, and $\sigma$ are the same as those of Equation (1) of the first embodiment; i is indicative of the class. In Equation (2), i is indicative of the value (class) into which the value indicative of the specification "Suspension" included in the specification information is quantized.

In Equation (2), $f_5(i, \alpha)$, $f_6(i, \beta)$, $f_7(i, \gamma)$, and $f_8(i, \sigma)$ are each a function for providing an evaluation value that monotonously increases according to each of $\alpha$, $\beta$, $\gamma$, and $\sigma$. That is, the design concept of $f_5(i, \alpha)$, $f_6(i, \beta)$, $f_7(i, \gamma)$, and $f_8(i, \sigma)$ is the same as that of $f_1(\alpha)$, $f_2(\beta)$, $f_3(\gamma)$, and $f_4(\sigma)$ in Equation (1), respectively.

However, $f_5(i, \alpha)$, $f_6(1, \beta)$, $f_7(i, \gamma)$, and $f_8(i, \sigma)$ in Equation (2) include, as a parameter (i), the value (class) into which the value indicative of the specification "Suspension" is quantized.

Here, as described above, according to the specification, the calculation function 22M quantizes the value specified by the specification into any one of classes 1 to N in a manner such that the value specified by the specification is quantized into a class of a greater value when the value specified by the specification less likely absorbs the influence exerted by the degradation status of the road surface RS on the traveling. On the other hand, according to the specification, the calculation function 22M quantizes the value specified by the specification into any one of classes 1 to N in a manner such that the value specified by the specification is quantized into a class of a smaller value when the value specified by the specification more likely absorbs the influence exerted by the degradation status of the road surface RS on the traveling.

For example, for the specification "Suspension", the longer the stroke, the more likely the irregularities of the road surface RS are absorbed. Thus, the division evaluation value Ebs of the divided regions B corresponding to the specification "Suspension" is a smaller value as compared with the other specifications even when all the parameters ($\alpha$, $\beta$, $\gamma$, and $\sigma$) have larger values.

Likewise, for the other specifications (here, the drive method and the tire), the calculation function 22M also calculates the division evaluation value of each of the divided regions B. Then, the calculation function 22M employs the total value of the division evaluation value corresponding to each calculated specification as the division evaluation value of the corresponding divided region B. Then, the calculation function 22M calculates the evaluation value of the road surface RS in the same manner as the calculation function 20M of the first embodiment.

As described above, in this modified example, the calculation function 22M calculates the evaluation value depending on the specification information indicative of the specification that affects the surface of contact of the mobile body 13 with the road surface RS, and the degradation status information 30.

Thus, in this modified example, in addition to the aforementioned effects of the first embodiment, it is possible to provide highly accurate travel assistance depending on the road surface status and the specification of the mobile body 13.

Second Embodiment

In this embodiment, the evaluation value of a road surface is calculated for each of a plurality of travel lines.

Figure 6:
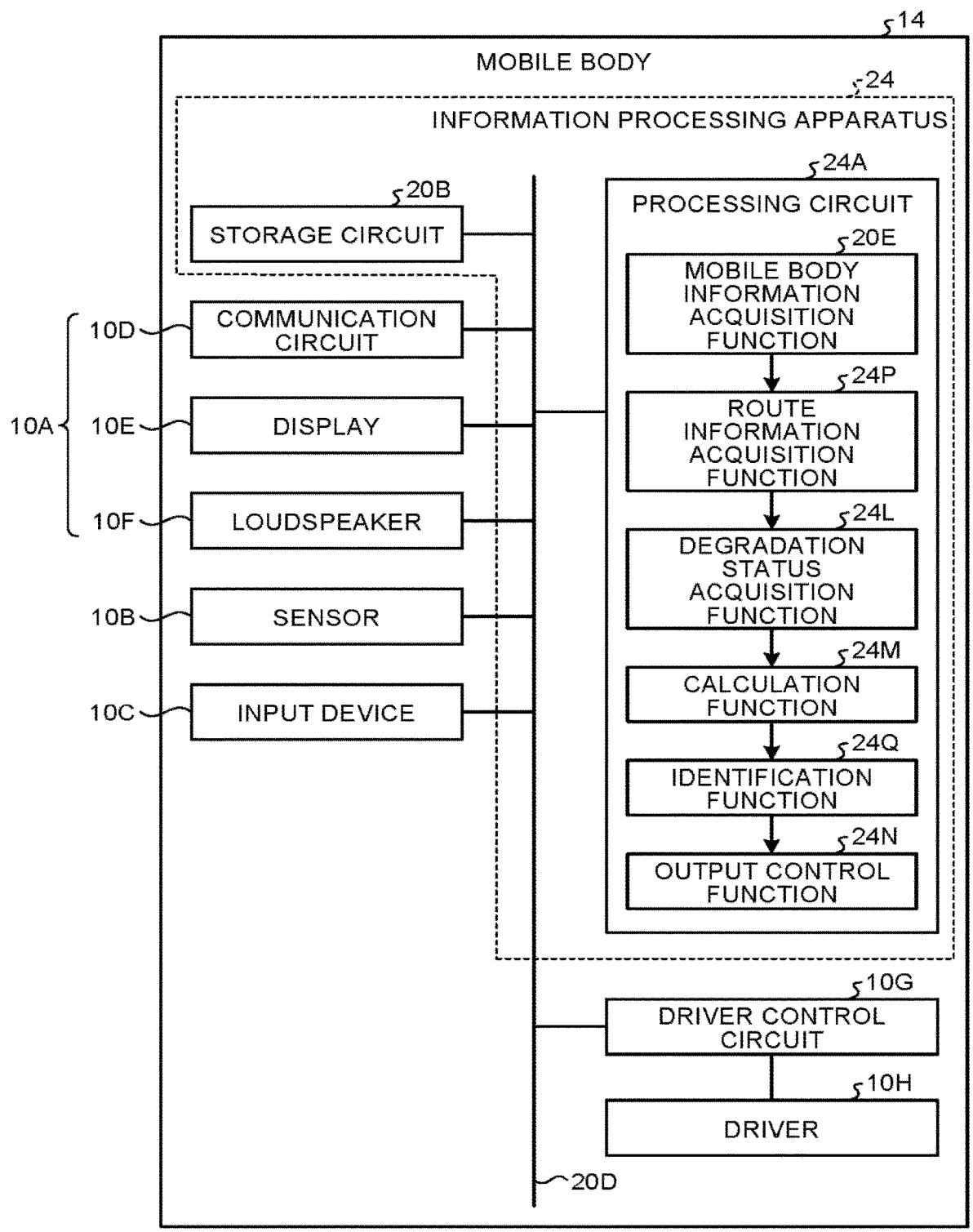
FIG. 6 is a block diagram illustrating a mobile body.

FIG. 6 is a block diagram illustrating an exemplary configuration of a mobile body 14 of this embodiment. The mobile body 14 is provided with an information processing apparatus 24, the output circuit 10A, the sensor 10B, the input device 10C, the driver control circuit 10G, and the driver 10H. The mobile body 14 is configured in the same manner as the mobile body 10 of the first embodiment except that the information processing apparatus 20 is replaced by the information processing apparatus 24 (also see FIG. 1).

The information processing apparatus 24 has the storage circuit 20B and a processing circuit 24A. The information processing apparatus 24 is configured in the same manner as the information processing apparatus 20 of the first embodiment except that the processing circuit 20A is replaced by the processing circuit 24A.

The processing circuit 24A is provided with the mobile body information acquisition function 20E, a route information acquisition function 24P, a degradation status acquisition function 24L, a calculation function 24M, an identification function 24Q, and an output control function 24N. The mobile body information acquisition function 20E is the same as that of the first embodiment.

Each processing function of the processing circuit 24A is stored in the storage circuit 20B in the form of a computer executable program. The processing circuit 24A is a processor for implementing the function corresponding to each program by reading the program from the storage circuit 20B and executing the same.

The processing circuit 24A having read each program has each function illustrated in the processing circuit 24A of FIG. 6. Referring to FIG. 6, a description will be made below on the presumption that a single processing circuit 24A implements the mobile body information acquisition function 20E, the route information acquisition function 24P, the degradation status acquisition function 24L, the calculation function 24M, the identification function 24Q, and the output control function 24N.

Note that the processing circuit 24A may also be configured from a combination of a plurality of independent processors for implementing each of the functions. In this case, each processor executes the program to thereby implement each function. On the other hand, each processing function may also be configured as a program so that one processing circuit may execute each program, or a particular function may also be implemented in a dedicated independent program execution circuit.

The route information acquisition function 24P acquires the route information of a plurality of routes R to be traveled from the current position to a destination of the mobile body 14. In other words, the route information acquisition function 24P acquires route candidates from the current position to the destination.

Route candidates are expressed by one or a plurality of candidate routes R to be traveled between the current position and the destination of the mobile body 14. The route candidate can be expressed, for example, by a graph with the switching point of the route R being "a node" and the route R being "an edge (branch or side)".

Note that the route information acquisition function 24P may employ, as the current position of the mobile body 14, the current position included in the mobile body information acquired by the mobile body information acquisition function 20E.

Figure 7A:
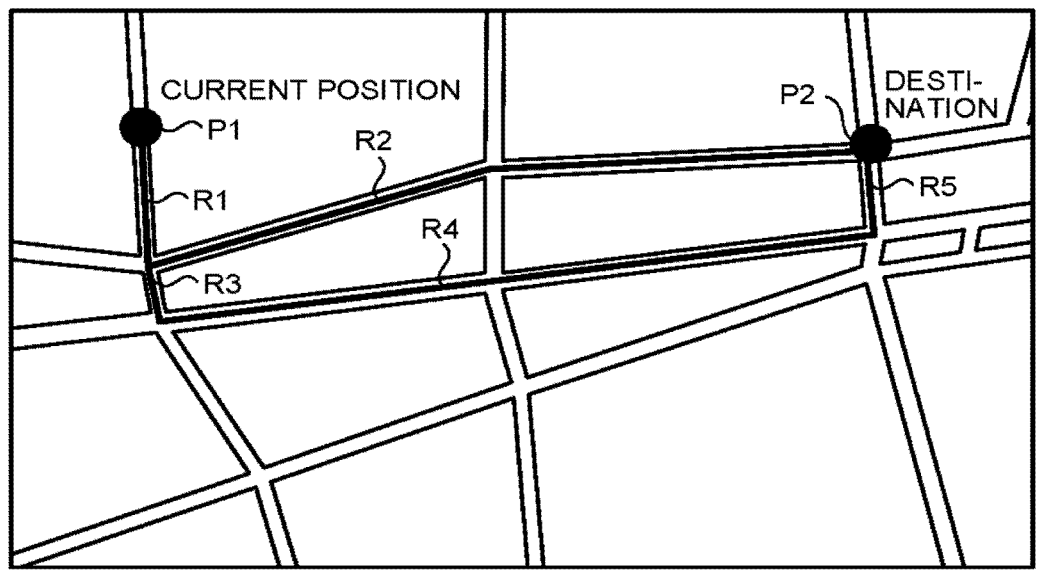
FIGS. 7A and 7B illustrate examples of route candidates.
Figure 7B:
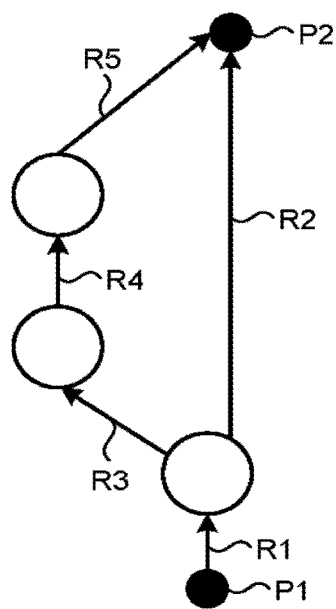

FIGS. 7A and 7B illustrate examples of route candidates. FIG. 7A is a view illustrating a plurality of routes R on a map (a route R1 to route R5) to be traveled from a current position P1 to a destination P2 of the mobile body 14. FIG. 7B is a schematic diagram illustrating an example of a graph indicative of route candidates.

For example, the route information acquisition function 24P stores, in advance in the storage circuit 20B, the graph indicative of the connection relation between the routes R. Then, the route information acquisition function 24P identifies on which route R the current position P1 of the mobile body 14 and the destination P2 specified by an instruction by the user manipulating the input device 10C are located.

For example, when the current position P1 and the destination P2 illustrated in FIG. 7A are specified, the route information acquisition function 24P creates a graph illustrated in FIG. 7B. This allows the route information acquisition function 24P to acquire the route information of a plurality of routes R expressed by the graph.

Note that the method for creating a graph indicative of route candidates by the route information acquisition function 24P is not limited to the method above. The route information acquisition function 24P may create a graph indicative of route candidates using well-known various types of methods employed in the field of a car navigation system or GIS.

Referring back to FIG. 6, a description will be continued. Like the degradation status acquisition function 20L of the first embodiment, the degradation status acquisition function 24L acquires the degradation status information 30. In this embodiment, the degradation status acquisition function 24L acquires the degradation status information 30, acquired by the route information acquisition function 24P, corresponding to the routes R of a plurality of pieces of route information. That is, in this embodiment, the degradation status acquisition function 24L acquires the degradation status information 30 corresponding to each of a plurality of routes R.

The calculation function 24M calculates the evaluation value of the road surface RS for each route R according to the degradation status information 30 of each of a plurality of routes R.

Like the calculation function 20M, the calculation function 24M calculates the evaluation value for each route R. That is, like the calculation function 20M, the calculation function 24M calculates an evaluation value for each of the routes R of a plurality of pieces of route information acquired by the route information acquisition function 24P.

The identification function 24Q employs the evaluation value of each of the routes R calculated by the calculation function 24M to identify a travel line into which the routes R are combined so that the total value of the evaluation values from the current position P1 to the destination P2 is minimized. The total value of evaluation values is the total value of the evaluation values of the plurality of routes R that are traveled from the current position P1 until the destination P2 is reached.

More specifically, the identification function 24Q employs the Dijkstra's algorithm typically used in the graph theory to calculate a travel line that is made up of a combination of the routes R with the minimum total value of the evaluation values from the current position P1 to the destination P2. This allows the identification function 24Q to identify the travel line of the minimum evaluation value.

Note that with the help of various types of algorithms suggested in the field of the graph theory, the identification function 24Q may also identify the travel line of the minimum total value of evaluation values of the routes R from the current position P1 to the destination P2.

The output control function 24N is an example of an output controller. Like the output control function 20N, the output control function 24N outputs an evaluation value. In this embodiment, the output control function 24N outputs a travel line identified by the identification function 24Q and the evaluation value of the travel line.

Note that like the output control function 20N, the output control function 24N may output the identified travel line and the evaluation value of the travel line to at least one of the driver control circuit 10G and the output circuit 10A.

Figure 8:
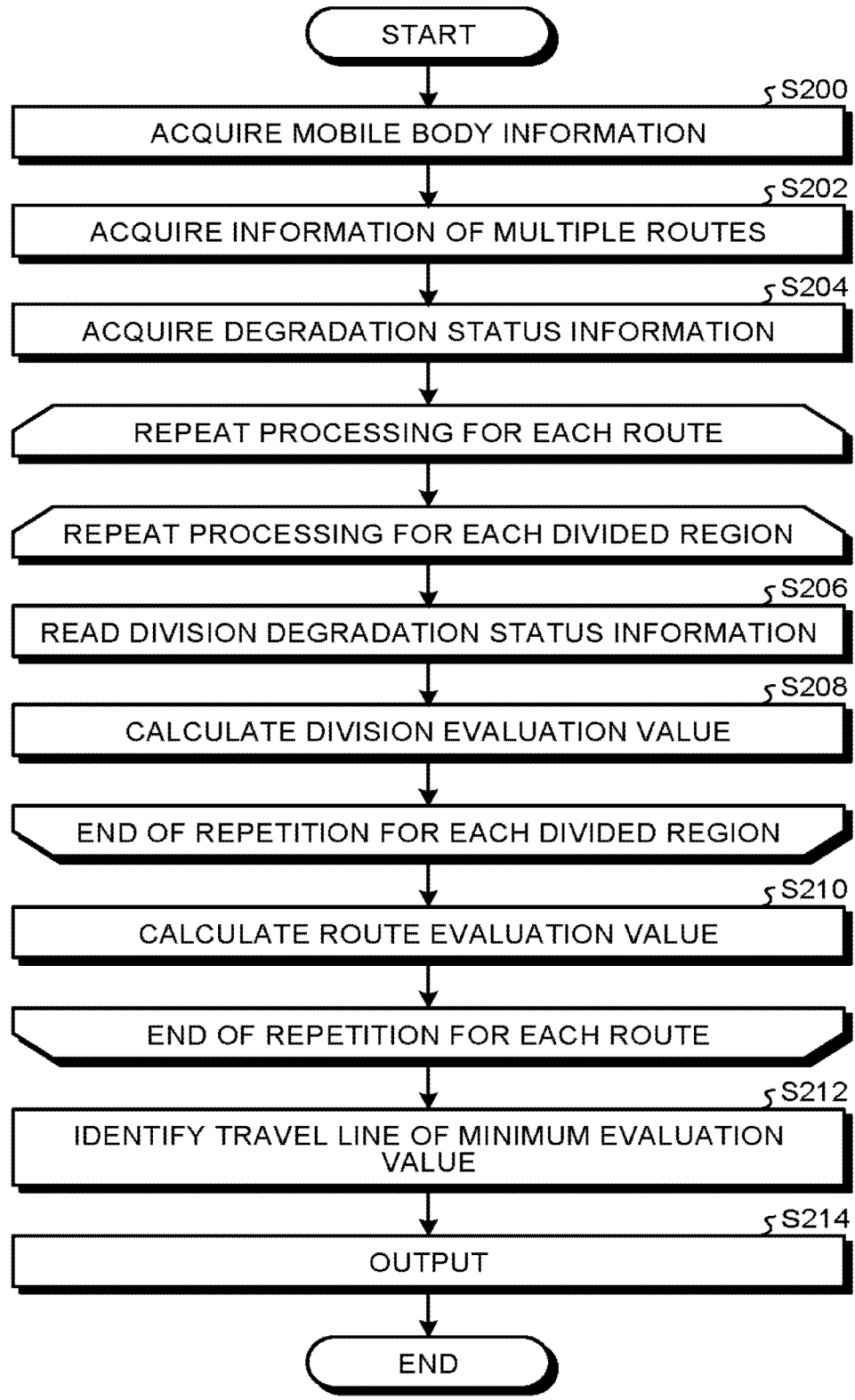
FIG. 8 is a flow chart of a procedure for processing information.

Now, a description will be made to the information processing procedure executed by the processing circuit 24A. FIG. 8 is a flow chart of an example of the information processing procedure executed by the processing circuit 24A.

First, the mobile body information acquisition function 20E acquires the mobile body information (step S200).

Then, the route information acquisition function 24P acquires the route information of a plurality of routes R to be traveled from the current position P1 to the destination P2 of the mobile body 14 (step S202).

Then, the degradation status acquisition function 24L acquires the degradation status information 30 acquired in step S202 corresponding to each of the plurality of routes (step S204).

Then, the calculation function 24M repeats the processing of step S206 to step S210 for each route R acquired in step S202. Furthermore, the calculation function 24M repeats the processing of step S206 to step S208 for each divided region.

More specifically, the calculation function 24M reads, from the degradation status information 30, the division degradation status information of the divided region B to be processed (step S206). Then, the calculation function 24M calculates the division evaluation value Eb of the divided region B to be processed using the division degradation status information having been read in step S206 (step S208).

Then, for all the divided regions B included in the degradation status information 30, the process proceeds to step S210 when the processing of step S206 to step S208 is ended.

In step S210, the calculation function 24M calculates the evaluation value of the route R using the division evaluation value calculated in step S206 to step S208 (step S210).

Then, the process proceeds to step S212 when the calculation function 24M ends the processing of step S206 to step S210 for all the routes R acquired in step S202.

Then, the identification function 24Q identifies travel line of a combination of the routes R so as to minimize the total value of the evaluation values from the current position P1 to the destination P2 (step S212). Then, the output control function 24N outputs the evaluation value of the travel line identified in step S212 (step S214), and then the process exits the routine.

As described above, the information processing apparatus 24 of this embodiment identifies the travel line of a combination of the routes R with the minimum total value of the evaluation values from the current position P1 to the destination P2 among a plurality of routes R to be traveled from the current position P1 to the destination P2.

Thus, in addition to the effects of the aforementioned embodiment, the information processing apparatus 24 of this embodiment is capable of providing travel assistance depending on the degradation status of the road surface RS of the route R to be traveled until the destination P2 is reached.

Furthermore, the information processing apparatus 24 outputs, to the driver control circuit 10G, the travel line of a combination of routes R with the minimum total value of evaluation values and the evaluation value of the travel line, which can be used to determine the optimum travel line depending on the degradation status of the road surface RS when the driver control circuit 10G provides control for automatic operation.

Furthermore, the information processing apparatus 24 provides the driver of the mobile body 14 with the information (the evaluation value) relating to a travel line of greater difficulty with traveling, thus achieving a less burden of the driver.

Third Embodiment

In this embodiment, the maximum rudder angle is further employed to calculate the evaluation value.

Figure 9:
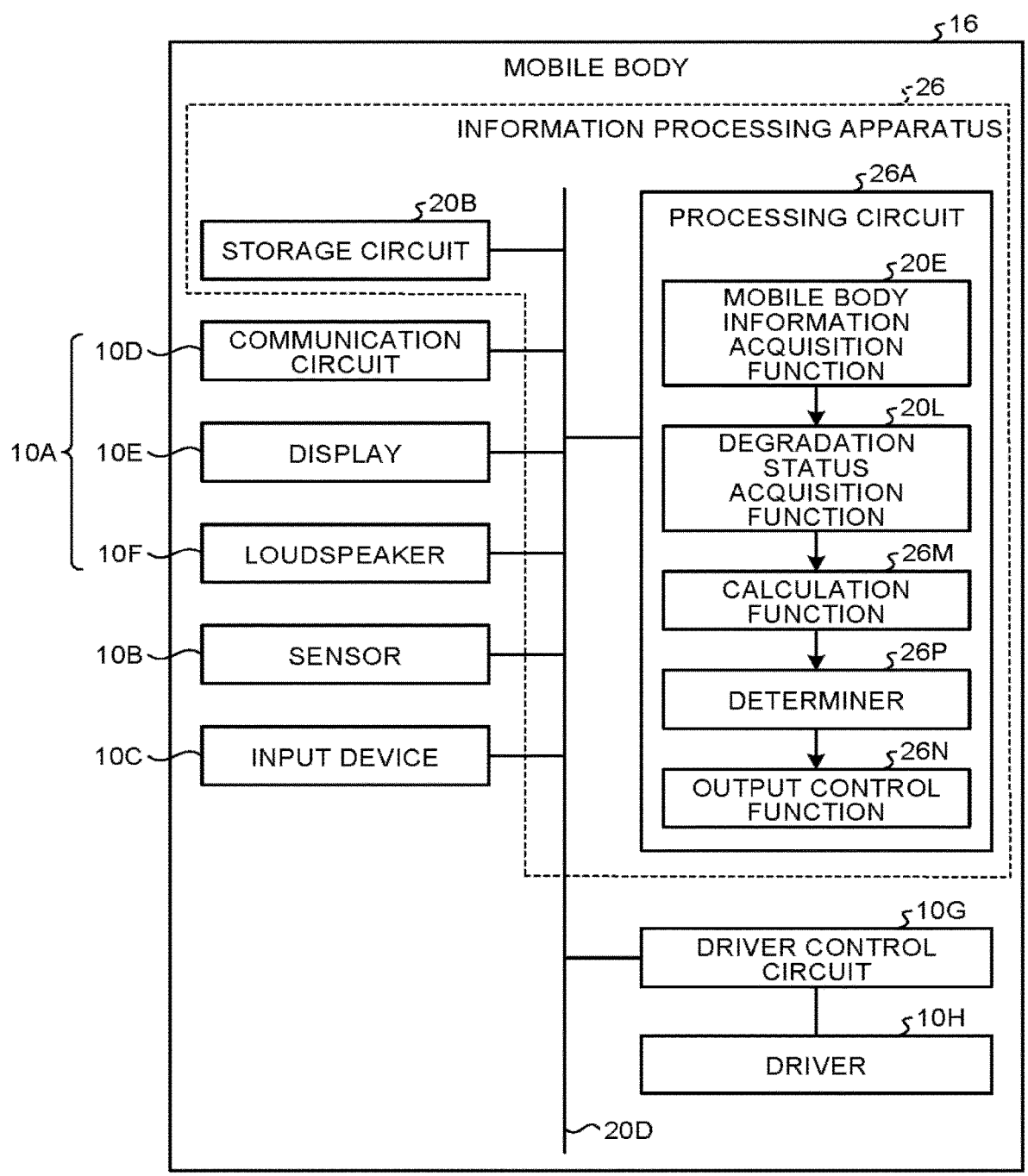
FIG. 9 is a block diagram illustrating a mobile body.

FIG. 9 is a block diagram illustrating an exemplary configuration of a mobile body 16 of this embodiment. The mobile body 16 is provided with an information processing apparatus 26, the output circuit 10A, the sensor 10B, the input device 10C, the driver control circuit 10G, and the driver 10H. The mobile body 16 is configured in the same manner as the mobile body 10 of the first embodiment except that the information processing apparatus 20 is replaced by the information processing apparatus 26 (also see FIG. 1).

The information processing apparatus 26 has the storage circuit 20B and a processing circuit 26A. The information processing apparatus 26 is configured in the same manner as the information processing apparatus 20 of the first embodiment except that the processing circuit 20A is replaced by the processing circuit 26A.

The processing circuit 26A is provided with the mobile body information acquisition function 20E, the degradation status acquisition function 20L, a calculation function 26M, a determiner 26P, and an output control function 26N. The mobile body information acquisition function 20E and the degradation status acquisition function 20L are the same as those of the first embodiment.

Each processing function in the processing circuit 26A is stored in the storage circuit 20B in the form of a computer executable program. The processing circuit 26A is a processor for implementing the function corresponding to each program by reading the program from the storage circuit 20B and executing the same.

The processing circuit 26A having read each program has each function illustrated in the processing circuit 26A of FIG. 9. Referring to FIG. 9, a description will be made below on the presumption that the single processing circuit 26A implements the mobile body information acquisition function 20E, the degradation status acquisition function 20L, the calculation function 26M, and the output control function 26N.

Note that the processing circuit 26A may also be configured from a combination of a plurality of independent processors for implementing each of the functions. In this case, each processor executes the program to thereby implement each function. On the other hand, each processing function may also be configured as a program so that one processing circuit may execute each program, or a particular function may also be implemented in a dedicated independent program execution circuit.

Like the calculation function 20M of the first embodiment, the calculation function 26M calculates the evaluation value of a current travel route R of the mobile body 16 on the basis of the degradation status information 30 of the road surface RS of the current travel route R. However, the calculation function 26M of this embodiment calculates the evaluation value of an evaluation target zone on the road surface RS, the evaluation target zone being oriented from the current position of the mobile body 16 along each of a plurality of steering directions having mutually different rudder angles within the range of the maximum rudder angle of the mobile body 16. As in the aforementioned embodiment, the evaluation value is indicative of the difficulty with the traveling of the mobile body 16. The evaluation target zone is a group of divided regions B which evaluation vectors pass through. The evaluation vector will be discussed later.

A description will be made in more detail. First, like the calculation function 20M of the first embodiment, the calculation function 26M acquires, from the degradation status acquisition function 20L, the degradation status information 30 of the road surface RS of the current travel route R of the mobile body 16. Then, like the calculation function 20M of the first embodiment, the calculation function 26M calculates the evaluation value of each of the divided regions B (the division evaluation value) using the division degradation status information of the divided regions B included in the degradation status information 30.

Then, the calculation function 26M acquires the maximum rudder angle information indicative of the maximum rudder angle of the mobile body 16. The maximum rudder angle is the maximum value of rudder angles.

For example, the storage circuit 20B stores in advance the maximum rudder angle information of the mobile body 16. Then, the calculation function 26M acquires the maximum rudder angle information by reading the maximum rudder angle information from the storage circuit 20B.

Note that the mobile body information acquisition function 20E may also acquire the mobile body information including the maximum rudder angle information in addition to the current position and the travel direction of the mobile body 16. In this case, the mobile body information acquisition function 20E may acquire the maximum rudder angle information of the mobile body 16, for example, from the sensor 10B. Then, the calculation function 26M may acquire the maximum rudder angle information from the mobile body information acquisition function 20E.

Note that a description will be made below on the presumption that the angle of a tire of the mobile body 16 is the rudder angle with the angle of a tire being 0° when the mobile body 16 is traveling in a straight line.

Figure 10:
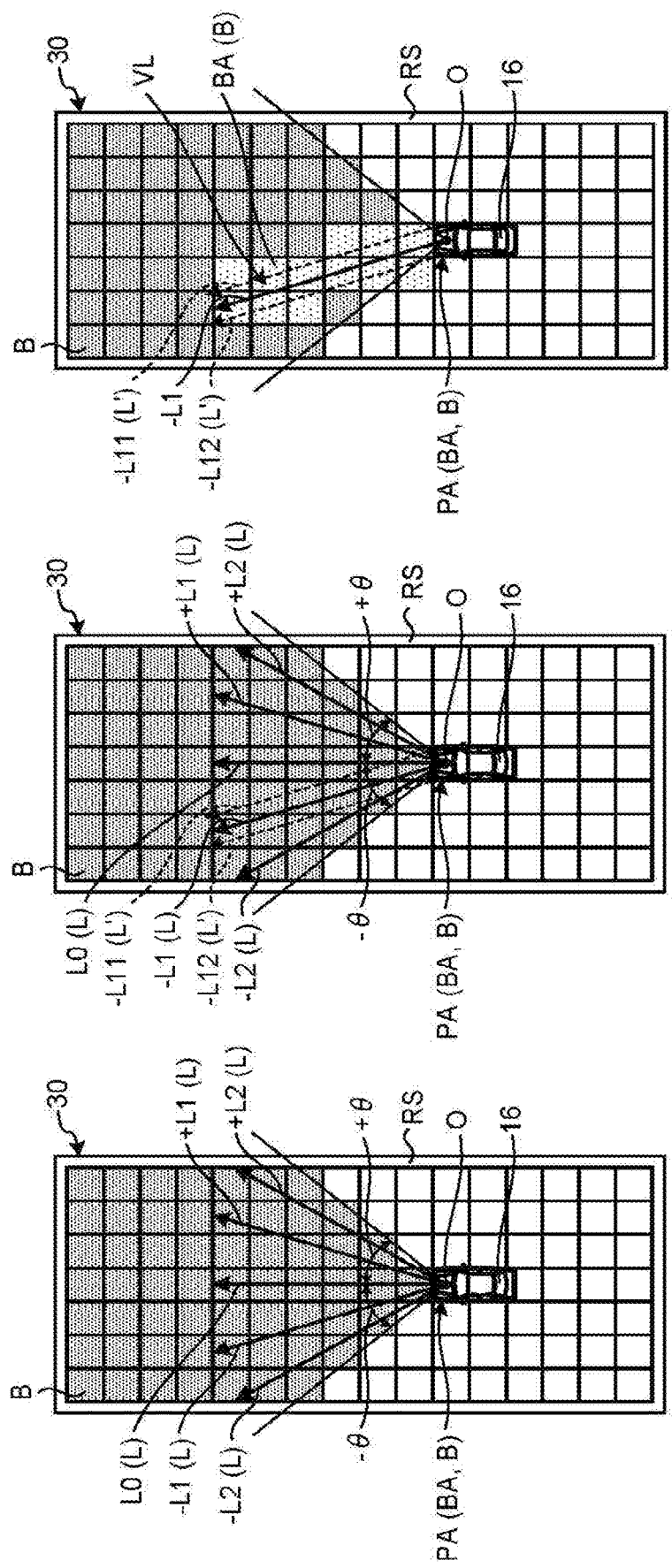
FIGS. 10A to 10C illustrate the calculation of an evaluation value.

FIGS. 10A, 10B, and 10C illustrate the calculation of evaluation values by the calculation function 26M.

The calculation function 26M reads the current position and the travel direction of the mobile body 16 included in the mobile body information acquired by the mobile body information acquisition function 20E. Then, the calculation function 26M identifies the current position of the mobile body 16 on the road surface RS of the current travel route R.

For example, the degradation status acquisition function 20L acquires, for each of the divided regions B, the degradation status information 30 which specifies the position information (GPS information) and the division degradation status information. Then, the calculation function 26M identifies the divided regions B for which specified is the position information including the current position of the mobile body 16 in the degradation status information 30. This allows the calculation function 26M to identify the divided region B corresponding to the current position of the mobile body 16 in the degradation status information 30. In the example illustrated in FIG. 10A, the divided region BA located at a position PA in the degradation status information 30 is identified as the divided region B corresponding to the current position of the mobile body 16. Note that the calculation function 26M preferably identifies the divided region BA equivalent to the position of the steering wheel of the mobile body 16 as the divided region B corresponding to the current position of the mobile body 16.

Then, with the center of gravity of the identified divided region BA being defined as the center O, the calculation function 26M divides the angle, which is defined by the maximum rudder angle from the travel direction L0 of the mobile body 16 to the left and right (+θ, −θ), by a predetermined division number M (M is an integer equal to 2 or greater). Then, the calculation function 26M determines vectors L (L0, −L1, −L2, L1, and L2) extending in the respective divided directions from the center O as a vector oriented in each of a plurality of steering directions having different rudder angles (hereinafter referred to as the steering direction vector L).

Then, for each steering direction vector L (L0, −L1, −L2, L1, and L2), the calculation function 26M calculates a pair of evaluation vectors L' which are parallel to a steering direction vector L and spaced apart from each other to the right and left by a separation s with respect to the steering direction vector L.

In the case of the steering direction vector −L1, as illustrated in FIG. 10B, the calculation function 26M calculates an evaluation vector −L'11 and an evaluation vector −L'12 as the pair of evaluation vectors L' corresponding to the steering direction vector −L1. Note that the shortest distance between the steering direction vector −L1 and the evaluation vector '1L'11 and the shortest distance between the steering direction vector −L1 and the evaluation vector −L'12 coincide with the separation s. Furthermore, the shortest distance between a pair of evaluation vectors L' (i.e., the separation s×2) coincides with the distance between a pair of tires disposed in a direction intersecting the travel direction of the mobile body 16 (for example, the distance between a pair of front wheels when the mobile body 16 is a four-wheeled automobile).

Then, the calculation function 26M employs, as an evaluation target zone VL, a group of divided regions B through which each of the pair of evaluation vectors L' calculated for each steering direction vector L (L0, −L1, −L2, L1, and L2) passes. More specifically, the evaluation target zone VL is a group of divided regions B through which a pair of evaluation vectors L' corresponding to a steering direction vector L pass. That is, the aforementioned processing allows the calculation function 26M to identify the evaluation target zone VL oriented along each of a plurality of rudder angle directions having mutually different rudder angles within the range of the maximum rudder angle of the mobile body 16.

Then, as illustrated in FIG. 10C, for each evaluation target zone VL, the calculation function 26M calculates, as the evaluation value of each evaluation target zone VL, the total value of the evaluation values (the division evaluation values), in the degradation status information 30, of the divided regions B through which each evaluation target zone VL passes. In the example illustrated in FIG. 10C, the calculation function 26M calculates, as the evaluation value of the evaluation target zone VL, the total value of the evaluation values (the division evaluation values), in the degradation status information 30, of the divided region BA or the divided regions B through which the evaluation target zone VL for the steering direction vector −L1 passes.

Referring to FIG. 9, the determiner 26P determines, as a recommended travel direction of the mobile body 16, the direction along the evaluation target zone VL indicative of the minimum evaluation value among those evaluation values calculated by the calculation function 26M. In other words, the determiner 26P determines, as the recommended travel direction, the direction shown by the steering direction vector L corresponding to the evaluation target zone VL indicative of the minimum evaluation value.

Like the output control function 20N, the output control function 26N outputs the evaluation value. In this embodiment, the output control function 26N outputs the recommended travel direction determined by the determiner 26P and the evaluation value of the evaluation target zone VL in the recommended travel direction.

Note that the output control function 26N may only have to output the recommended travel direction determined by the determiner 26P and the evaluation value to at least one of the driver control circuit 10G and the output circuit 10A.

For example, the driver control circuit 10G may also control the driver 10H by creating the driver control signal for controlling the driver 10H depending on the recommended travel direction determined by the determiner 26P and the evaluation value.

Note that the output control function 26N may also calculate the recommended travel line of the mobile body to from the recommended travel direction determined by the determiner 26P. For example, the output control function 26N converts the recommended travel direction determined by the determiner 26P into a recommended travel line on an actual road surface RS.

Figure 11:
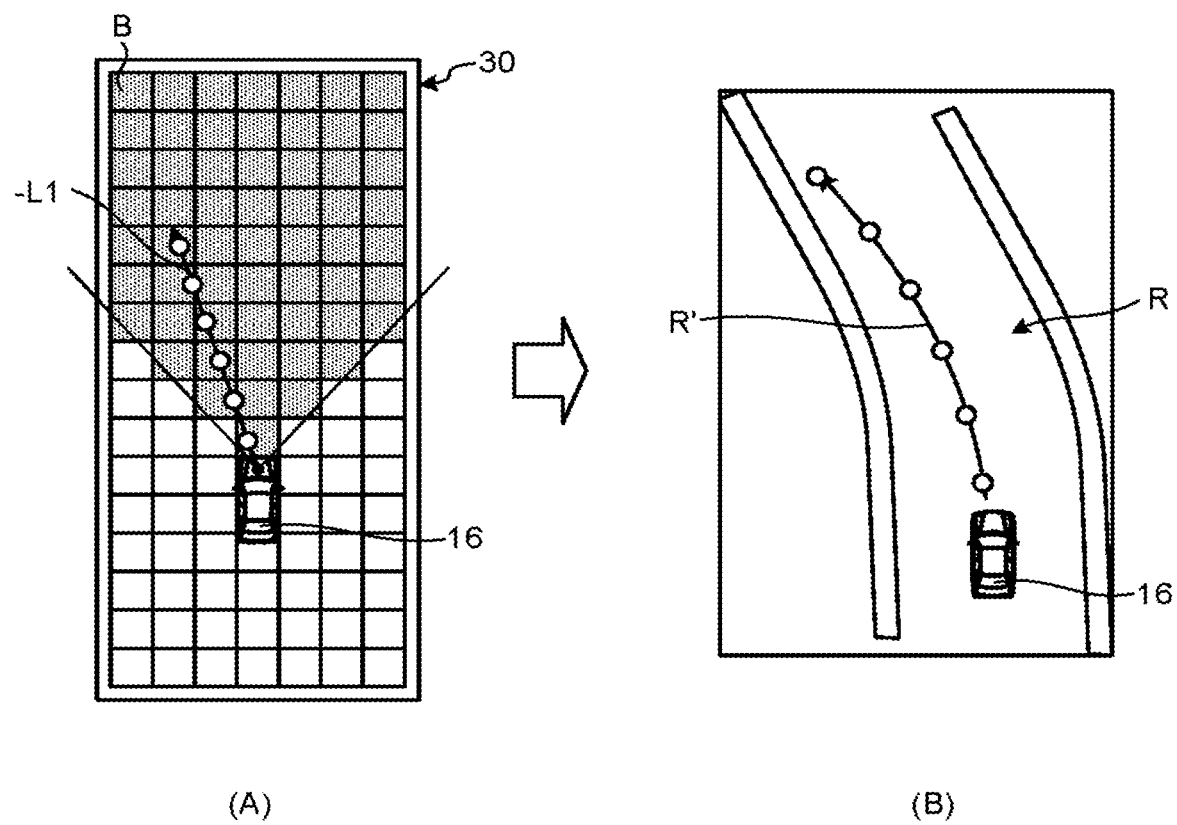
FIG. 11 is an explanatory view illustrating recommended travel lines.

FIG. 11 is an explanatory view illustrating an example of a recommended travel line. As illustrated in (A) in FIG. 11, the output control function 26N samples, at certain intervals, the recommended travel direction determined by the determiner 26P (for example, a direction along the steering direction vector −L1). Then, the output control function 26N derives in which divided region B of the degradation status information 30 each sampling point 40 is included. Then, the determiner 26P determines the position coordinates of each sampling point 40 on the road surface RS by complementary processing using the GPS information defined for the four corners of the derived divided region B.

Then, the output control function 26N connects, with a spline curved line, each sampling point 40 converted into the position coordinates on the road surface RS, thereby calculating a recommended travel line R' (see (B) in FIG. 11).

In this case, the output control function 26N may only have to output the information indicative of the calculated recommended travel line R' to at least one of the driver control circuit 10G and the output circuit 10A.

For example, the driver control circuit 10G creates the driver control signal for controlling the driver 10H and then controls the driver 10H so that the recommended travel line R' calculated by the output control function 26N is traveled.

Furthermore, for example, the display 10E of the output circuit 10A displays the recommended travel line R' calculated by the output control function 26N.

Figure 12:
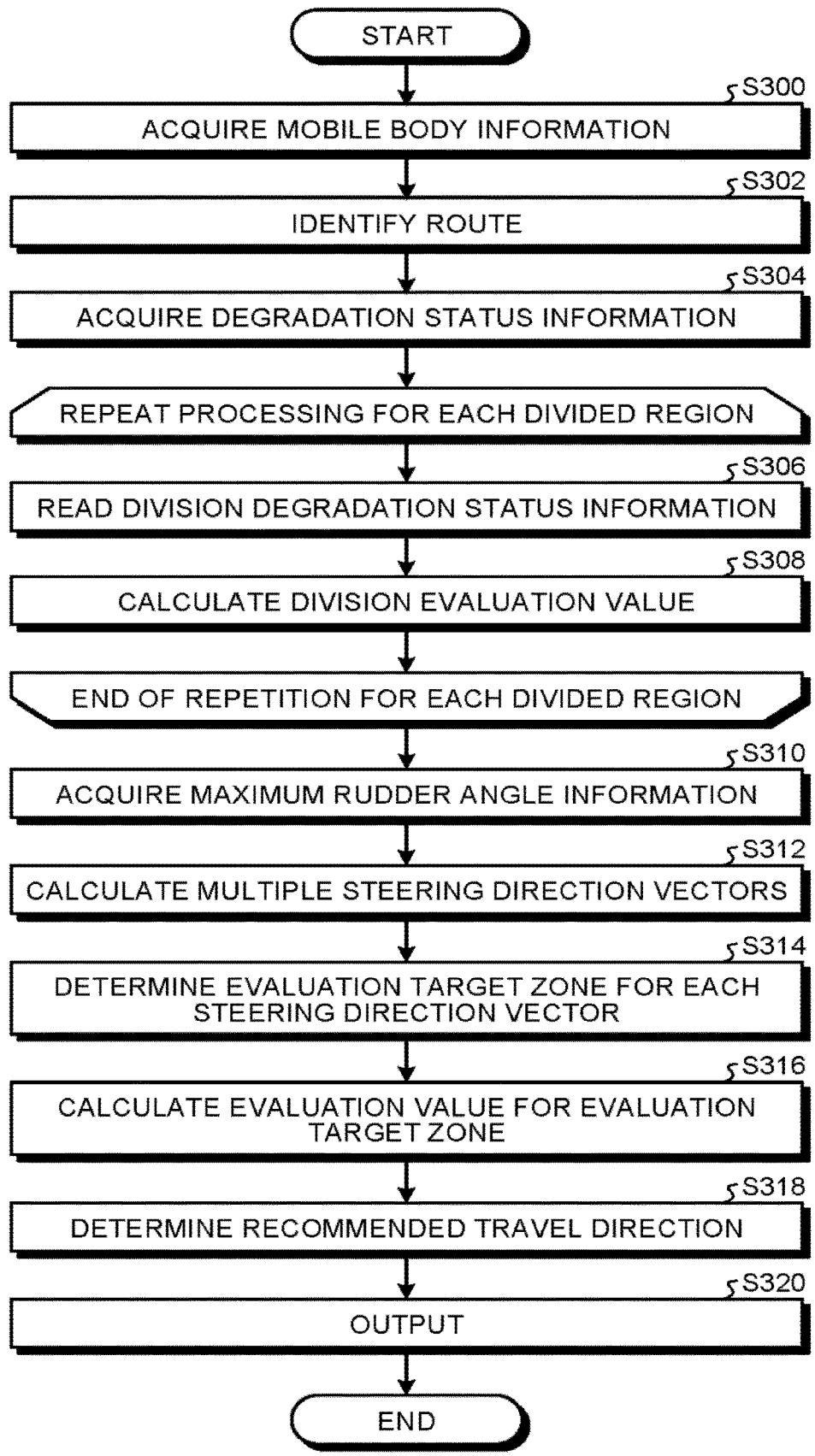
FIG. 12 is a flow chart of a procedure for processing information.

Now, a description will be made to the procedure of information processing executed by the processing circuit 26A. FIG. 12 is a flow chart illustrating an example of a procedure of information processing executed by the processing circuit 26A.

First, the mobile body information acquisition function 20E acquires the mobile body information (step S300). Then, the degradation status acquisition function 20L identifies the current travel route R of the mobile body 16 on the basis of the mobile body information (the current position and the travel direction) acquired in step S300 (step S302).

Then, the degradation status acquisition function 20L acquires the degradation status information 30 corresponding to the route R identified in step S302 (step S304).

Then, the calculation function 26M repeatedly executes the processing of step S206 to step S306 for each of the divided regions B included in the degradation status information 30 acquired in step S304. More specifically, the calculation function 26M reads, from the degradation status information 30, the division degradation status information of the divided region B be processed (step S306). Then, the calculation function 26M calculates the division evaluation value Eb of the divided region B to be processed using the division degradation status information having been read in step S306 (step S308).

Then, when the calculation function 26M ends the processing of step S306 to step S308 for each of all the divided regions B included in the degradation status information 30 of the route R identified in step S302, the process proceeds to step S310.

In step S310, the calculation function 26M acquires the maximum rudder angle information indicative of the maximum rudder angle of the mobile body 16 (step S310).

Then, the calculation function 26M determines a plurality of steering direction vectors L within the range of the maximum rudder angle of the mobile body 16, with the center of gravity of the divided region BA defined as the center O, the center of gravity being located at the current position of the mobile body 16 of the degradation status information 30 acquired in step S304 (step S312).

Then, the calculation function 26M determines the evaluation target zone VL for each steering direction vector L (step S314). As described above, the calculation function 26M calculates a pair of evaluation vectors L' for each steering direction vector L. Then, the calculation function 26M determines, as the evaluation target zone VL of each steering vector direction L, the area between a pair of evaluation vectors L' for each steering vector direction L.

Then, for each evaluation target zone VL, the calculation function 26M calculates, as the evaluation value of each evaluation target zone VL, the total value of evaluation values (division evaluation values) of the divided regions B through which each evaluation target zone VL passes (step S316).

Then, the determiner 26P determines, as the recommended travel direction of the mobile body 16, the direction along the evaluation target zone VL indicative of the minimum evaluation value among the evaluation values calculated in step S316 (step S318).

Then, the output control function 26N outputs the recommended travel direction determined in step S316 and the evaluation value of the evaluation target zone VL corresponding to the recommended travel direction to at least one of the driver control circuit 10G and the output circuit 10A (step S320). Then, the process exits the routine.

As described above, the information processing apparatus 26 of this embodiment allows the calculation function 26M to calculate the evaluation value of the evaluation target zone VL oriented along each of a plurality of rudder angle directions having mutually different rudder angles within the range of the maximum rudder angle of the mobile body 16 on the road surface RS from the current position of the mobile body 16. Then, the determiner 26P determines, as the recommended travel direction, the direction along the evaluation target zone VL having the minimum evaluation value.

As described above, the information processing apparatus 26 of this embodiment is capable of determining the direction of the easiest travel along the current travel route R depending on the degradation status of the road surface RS of the current travel route R of the mobile body 16, and the maximum rudder angle of the mobile body 16.

Thus, the information processing apparatus 26 of this embodiment is capable of providing travel assistance depending on the road surface status and the maximum rudder angle of the mobile body 16.

Furthermore, the output control function 26N outputs the recommended travel direction determined by the determiner 26P and the evaluation value of the evaluation target zone VL in the recommended travel direction to at least one of the driver control circuit 10G and the output circuit 10A.

Thus, the driver control circuit 10G controls the driver 10H depending on the recommended travel direction and the evaluation value, thereby allowing the mobile body 16 to travel in a direction of less degradation on the road surface RS. Furthermore, for an automatically drivable mobile body 16, it is possible to provide improved safety to automatic operation.

Furthermore, the output circuit 10A outputs the evaluation value and the recommended travel line R' from the output circuit 10A, thereby attracting the attention of the driver. Furthermore, the information processing apparatus 26 is capable of readily presenting, to the driver, the situation in which the operation mode will be switched with high possibility from the state of automatic operation to the automatic operation release state that requires driver's manipulation.

Figure 13:
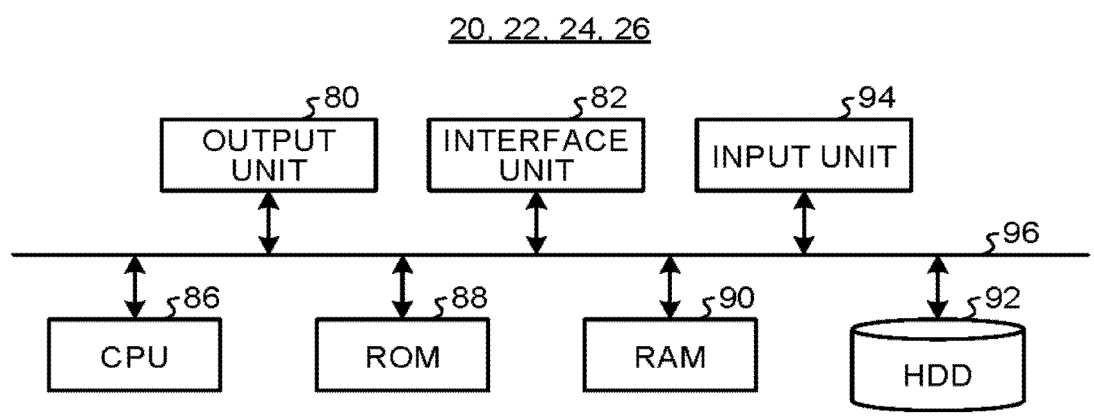
FIG. 13 is a hardware block diagram.

Now, a description will be made to an exemplary hardware configuration of the information processing apparatus 20, the information processing apparatus 22, the information processing apparatus 24, and the information processing apparatus 26 according to the aforementioned embodiments. FIG. 13 is an exemplary hardware block diagram of the information processing apparatus 20, the information processing apparatus 22, the information processing apparatus 24, and the information processing apparatus 26 according to the aforementioned embodiments.

The information processing apparatus 20, the information processing apparatus 22, the information processing apparatus 24, and the information processing apparatus 26 according to the aforementioned embodiments have a hardware configuration using typical computers and are provided with a controller such as a central processing unit (CPU) 86, a storage device such as a read only memory (ROM) 88, a random access memory (RAM) 90, or a hard disk drive (HDD) 92, an interface unit 82 acting as an interface with various types of devices, an output unit 80 for outputting various types of information such as output information, an input unit 94 for receiving manipulations by the user, and a bus 96 for connecting to each unit.

The information processing apparatus 20, the information processing apparatus 22, the information processing apparatus 24, and the information processing apparatus 26 according to the aforementioned embodiments allow the CPU 86 to read a program from the ROM 88 to the RAM 90 and then execute the same, thereby implementing each of the aforementioned functions on the computer.

Note that the programs for executing each of the aforementioned processes to be executed by the information processing apparatus 20, the information processing apparatus 22, the information processing apparatus 24, and the information processing apparatus 26 according to the aforementioned embodiments may also be stored in the HDD 92. On the other hand, the programs for executing each of the aforementioned processes to be executed by the information processing apparatus 20, the information processing apparatus 22, the information processing apparatus 24, and the information processing apparatus 26 according to the aforementioned embodiments may also be incorporated into the ROM 88 in advance before being provided.

Furthermore, the programs for executing the aforementioned processes to be executed by the information processing apparatus 20, the information processing apparatus 22, the information processing apparatus 24, and the information processing apparatus 26 according to the aforementioned embodiments may also be provided as a computer program product by being stored as an installable format or executable format file in a computer readable storage medium such as a CD-ROM, CD-R, memory card, Digital Versatile Disc (DVD), and flexible disk (FD). On the other hand, the programs for executing the aforementioned processes to be executed by the information processing apparatus 20, the information processing apparatus 22, the information processing apparatus 24, and the information processing apparatus 26 according to the aforementioned embodiments may also be stored in a computer connected to a network such as the Internet so as to be downloaded through the network and thereby provided. Furthermore, the programs for executing the aforementioned processes to be executed by the information processing apparatus 20, the information processing apparatus 22, the information processing apparatus 24, and the information processing apparatus 26 according to the aforementioned embodiments may also be provided or distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory; and
processing circuitry configured to operate as:
a degradation status imager configured to acquire degradation status information of a road surface from an external device; and
a calculator configured to calculate an evaluation value indicative of difficulty with traveling of a mobile body depending on the degradation status information, wherein
the degradation status information includes pieces of division degradation status information of a plurality of divided regions on the road surface.

2. The apparatus according to claim 1, further comprising a mobile body information acquirer configured to acquire mobile body information indicative of a current position and a travel direction of the mobile body, wherein
the degradation status acquirer acquires the degradation status information of the road surface of a current travel route of the mobile body, the route being identified based on the mobile body information, and
the calculator calculates the evaluation value of the road surface of the route depending on the degradation status information.

3. The apparatus according to claim 2, wherein the calculator calculates the evaluation value of a region, on the road surface, located along the travel direction from the current position of the mobile body.

4. The apparatus according to claim 1, wherein the degradation status information indicates at least one of a type of road surface degradation, a rate of presence of the road surface degradation, and a level of the road surface degradation.

5. The apparatus according to claim 4, wherein the type of road surface degradation is at least one of a crack, a crocodile crack, a pothole, and a rut.

6. The apparatus according to claim 1, wherein the calculator uses a function monotonously increasing with increase in a value indicative of the degradation status information to calculate the evaluation value.

7. The apparatus according to claim 1, wherein the calculator calculates the evaluation value depending on specification information indicative of a specification affecting a surface of contact of the mobile body with a road surface, and the degradation status information.

8. The apparatus according to claim 7, wherein the calculator calculates, as the evaluation value, a higher evaluation value for the specification information that affects more significant influence on deterioration of a travel environment.

9. The apparatus according to claim 7, wherein the specification information includes at least one of a piece of type information indicative of a type of the mobile body, a weight of the mobile body, a stroke length of a suspension of the mobile body, a drive method, and a width of a tire.

10. The apparatus according to claim 1, further comprising an output controller configured to output the evaluation value.

11. The apparatus according to claim 10, wherein the output controller outputs the evaluation value to at least one of a driver controller configured to control a driver of the mobile body and an output unit configured to output at least one of sound and light.

12. The apparatus according to claim 2, further comprising:
a route information acquirer configured to acquire route information of a plurality of routes that allow the mobile body to travel from the current position to a destination; and
an identifier configured to identify a travel line of a combination of the routes of the route information so as to minimize a total value of the evaluation values from the current position to the destination.

13. The apparatus according to claim 2, wherein
the calculator calculates the evaluation value of an evaluation target zone, on the road surface, oriented from the current position of the mobile body along each of a plurality of steering directions having mutually different rudder angles within a range of a maximum rudder angle of the mobile body, and
the apparatus further comprises a determiner configured to determine, as a recommended travel direction, a direction along the evaluation target zone having a minimum evaluation value.

14. The apparatus according to claim 2, wherein the mobile body information acquirer acquires the mobile body information from at least one of an external sensor and an internal sensor.

15. A mobile body comprising:
the information processing apparatus according to claim 1; and
an output controller configured to output the evaluation value to a driver controller configured to control a driver of the mobile body.

16. An information processing method comprising:
acquiring, by a degradation status imager, degradation status information of a road surface, and
calculating, by a calculator, an evaluation value indicative of difficulty with travel of a mobile body depending on the degradation status information, wherein
the degradation status information includes pieces of division degradation status information of a plurality of divided regions on the road surface.

17. The method according to claim 16, further comprising acquiring mobile body information indicative of a current position and a travel direction of the mobile body, wherein the acquiring of the degradation status information acquires the degradation status information of the road surface of a current travel route of the mobile body, the route being identified based on the mobile body information, and the calculating calculates the evaluation value of the road surface of the route depending on the degradation status information.

18. The method according to claim 17, wherein the calculating calculates the evaluation value of a region, on the road surface, located along the travel direction from the current position of the mobile body.

* * * * *